(12) United States Patent
Rabie et al.

(10) Patent No.: US 7,505,466 B2
(45) Date of Patent: Mar. 17, 2009

(54) METHOD AND SYSTEM FOR ETHERNET AND ATM NETWORK INTERWORKING

(75) Inventors: Sameh Rabie, Kanata (CA); Osama Aboul Magd, Kanata (CA); Bashar Abdullah, Ottawa (CA); Baghdad Barka, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 869 days.

(21) Appl. No.: 11/018,671

(22) Filed: Dec. 21, 2004

(65) Prior Publication Data

US 2005/0157729 A1   Jul. 21, 2005

Related U.S. Application Data

(60) Provisional application No. 60/537,744, filed on Jan. 20, 2004.

(51) Int. Cl.
*H04J 3/16* (2006.01)
*H04L 12/28* (2006.01)

(52) U.S. Cl. .................... 370/395.1; 370/466
(58) Field of Classification Search ............. 370/353, 370/354, 355, 356, 357, 392, 395.1, 395.51, 370/395.52, 395.53, 395.6, 395.61, 466, 370/467
See application file for complete search history.

(56) References Cited

U.S. PATENT DOCUMENTS

| | | | |
|---|---|---|---|
| 5,923,655 A * | 7/1999 | Veschi et al. ............... 370/394 |
| 6,222,848 B1 * | 4/2001 | Hayward et al. ............ 370/412 |
| 6,611,522 B1 | 8/2003 | Zheng et al. |
| 6,625,169 B1 * | 9/2003 | Tofano ....................... 370/466 |
| 6,751,221 B1 | 6/2004 | Saito et al. |
| 6,912,225 B1 | 6/2005 | Kohzuki et al. |
| 7,185,112 B1 * | 2/2007 | Kuranari et al. ............. 709/249 |
| 7,212,536 B2 * | 5/2007 | Mackiewich et al. ... 370/395.42 |
| 7,277,442 B1 | 10/2007 | Holmgren et al. |
| 2001/0055313 A1 * | 12/2001 | Yin et al. .................... 370/466 |
| 2002/0031142 A1 | 3/2002 | Metin et al. |
| 2002/0136224 A1 | 9/2002 | Motley |

(Continued)

OTHER PUBLICATIONS

Bot, "Key Technical Considerations When Using Ethernet Solutions in Existing ATM and Frame Relay Networks," *IEEE Communications Magazine*, Mar. 2004, pp. 96-102.

(Continued)

*Primary Examiner*—Chirag G Shah
*Assistant Examiner*—Nima Mahmoudzadeh
(74) *Attorney, Agent, or Firm*—Christopher & Weisberg, P.A.

(57) ABSTRACT

A method and system for interworking between an Ethernet communication network and an ATM network, in which a first network interface is operable to communicate with the Ethernet communication network using an Ethernet communication protocol. A second network interface is operable to communicate with the ATM communication network using an ATM protocol. A processing unit is in communication with the first network interface and the second network interface, in which the processing unit encapsulates frames received from the Ethernet network into ATM frames, decapsulates frames received from the ATM network to recover Ethernet frames and maps parameters corresponding to the received one of the ATM and Ethernet frames into the other of the ATM and Ethernet frames, the mapped parameters including connection configuration control plane information and data plane parameters corresponding to individual frames.

30 Claims, 28 Drawing Sheets

U.S. PATENT DOCUMENTS

| | | |
|---|---|---|
| 2002/0159462 A1 | 10/2002 | Demaria et al. |
| 2002/0176450 A1 | 11/2002 | Kong et al. |
| 2003/0031182 A1 | 2/2003 | O'Neil et al. |
| 2003/0053464 A1 | 3/2003 | Chen et al. |
| 2003/0067934 A1 | 4/2003 | Hooper et al. |
| 2003/0076838 A1 | 4/2003 | Shaio et al. |
| 2003/0103503 A1 | 6/2003 | Dubuc et al. |
| 2003/0118026 A1 | 6/2003 | Kuhl et al. |
| 2003/0126286 A1 | 7/2003 | Lee |
| 2004/0022255 A1 | 2/2004 | Chen et al. |
| 2004/0252717 A1 | 12/2004 | Solomon et al. |
| 2005/0141509 A1 | 6/2005 | Rabie et al. |
| 2005/0157729 A1 | 7/2005 | Rabie et al. |
| 2005/0169279 A1 | 8/2005 | Magd et al. |

OTHER PUBLICATIONS

Grossman et al, "Multiprotocol Encapsulation over ATM Adaptation Layer 5" (rfc2684), Sep. 1999, entire document. Downloaded from http://www.faqs.org/rfcs/rfc2684.html (Address valid as of Sep. 5, 2006.

* cited by examiner

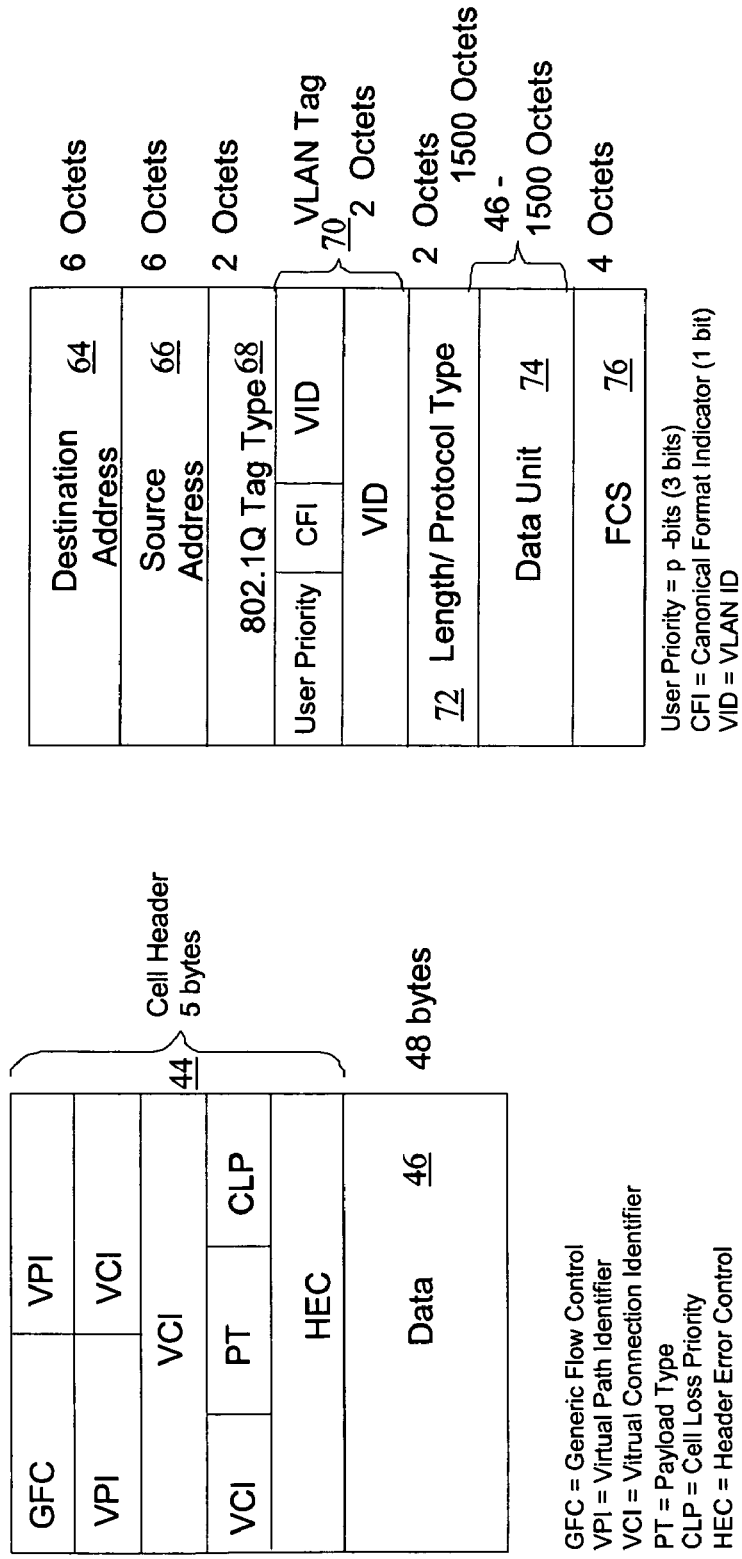
FIG. 2

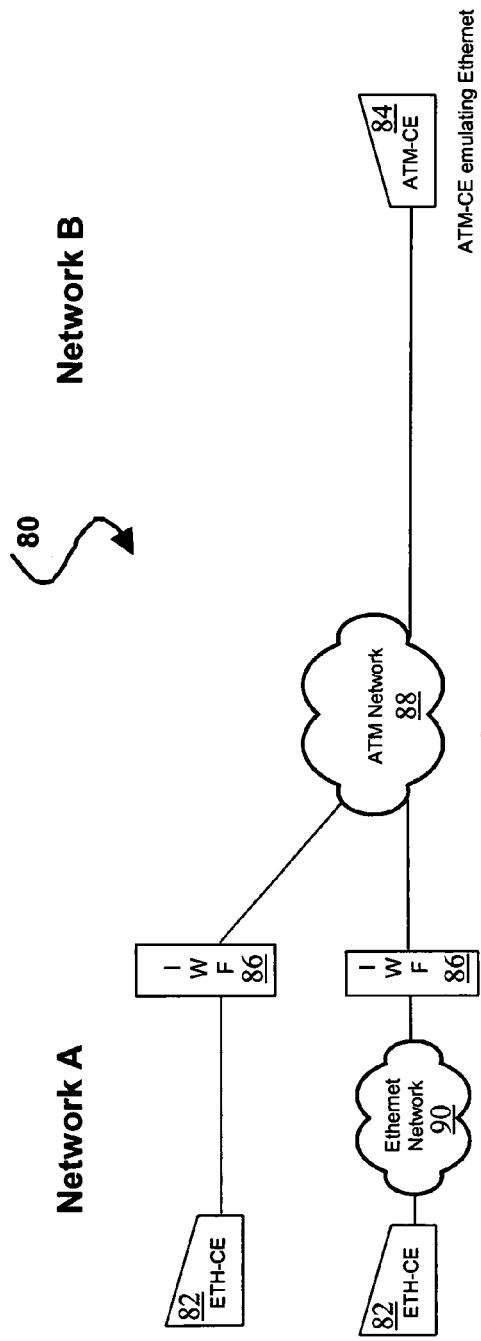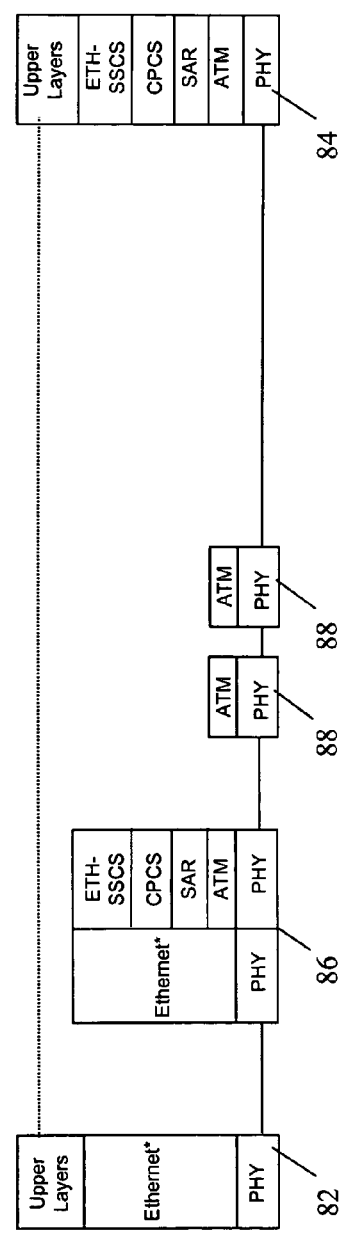
FIG. 6A
FIG. 6B

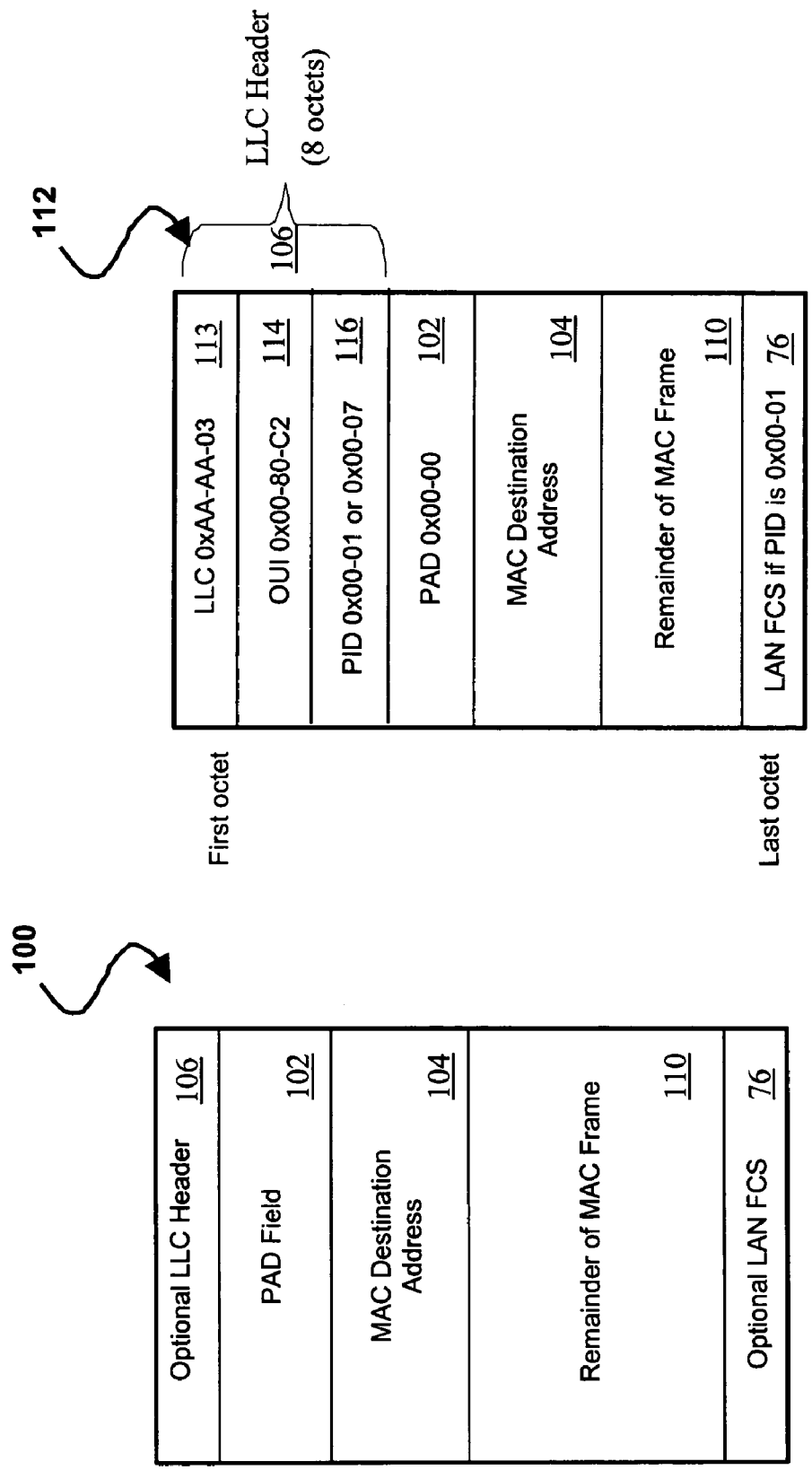

| | | ATM Layer Service Category 182 | | | | | |
|---|---|---|---|---|---|---|---|
| 184 | | CBR | rt-VBR | nrt-VBR | UBR/UBR+ | ABR | GFR |
| | PCR & CDVT | specified | specified | specified | specified | specified | specified |
| | SCR, MBS, CDVT | N/A | specified | specified | N/A | N/A | N/A |
| | MDCR/MCR | N/A | N/A | N/A | specified | specified | N/A |
| | MCR, MBS, MFS, CDVT | N/A | N/A | N/A | N/A | N/A | specified |
| | Peak-to-Peak CDV | specified | specified | specified | unspecified | unspecified | unspecified |
| | MaxCTD | specified | specified | specified | unspecified | unspecified | unspecified |
| | CLR | specified | specified | specified | Network specific | Network specific | Network specific |

Traffic Params 186

QoS Params 188

| Ethernet → ATM direction | |
|---|---|
| $PCR_{0+1}$=CIR+EIR or $PCR_{0+1}$=AR | 262 |
| MBS=CBS/(1-CIR/AR)+1 | 264 |
| $SCR_{0+1}$=CIR | 266 |
| $SCR_0$=CIR | 268 |
| MDCR=CIR | 270 |

| Ethernet → ATM direction | |
|---|---|
| $PCR_{0+1}$=PIR or $PCR_{0+1}$=AR | 284 |
| MBS=CBS/(1-CIR/AR)+1 | 264 |
| $SCR_{0+1}$=CIR | 266 |
| $SCR_0$=CIR | 268 |
| MDCR=CIR | 270 |

(282)

| Ethernet p-bits | ETH PHB | ETH Service Class | ATM Service Class | ATM VCC ID | ATM QoS | ATM CLP |
|---|---|---|---|---|---|---|
| 111 | EF | Platinum | Real-time | 1 | CBR | 0 |
| 110 | AF31 | Gold | Real-time | 1 | " | 0 |
| 101 | AF32 | Gold | Real-time | 1 | " | 1 |
| 100 | AF21 | Silver | Mission-critical data | 2 | rt-VBR | 0 |
| 011 | AF22 | Silver | Mission-critical data | 2 | " | 1 |
| 010 | AF11 | Bronze | Regular Data | 3 | nrt-VBR | 0 |
| 001 | AF12 | Bronze | Regular Data | 3 | " | 1 |
| 000 | DF | Best Effort | Regular Data | 3 | " | 1 |

FIG. 27

METHOD AND SYSTEM FOR ETHERNET AND ATM NETWORK INTERWORKING

CROSS-REFERENCE TO RELATED APPLICATIONS

This application is related to and claims priority to U.S. Patent Application No. 60/537,744, filed Jan. 20, 2004, entitled, ETHERNET DIFFERENTIATED SERVICES, the entirety of which is incorporated herein by reference. This application is also related to U.S. patent application Ser. No. 10/990,899, filed Nov. 17, 2004, entitled, METHOD AND SYSTEM FOR FRAME RELAY AND ETHERNET SERVICE INTERWORKING, and U.S. patent application Ser. No. 11/008,709, filed Dec. 9, 2004, entitled, METHOD AND SYSTEM FOR ETHERNET AND FRAME RELAY NETWORK INTERWORKING, and U.S. patent application Ser. No. 11/011,131, filed Dec. 13, 2004, entitled METHOD AND SYSTEM FOR ETHERNET AND ATM SERVICE INTERWORKING, all by the same inventors as the subject Application, the entirety of all of which are incorporated herein by reference.

STATEMENT REGARDING FEDERALLY SPONSORED RESEARCH OR DEVELOPMENT n/a

BACKGROUND OF THE INVENTION

1. Statement of the Technical Field

The present invention relates to the field of networking communications and more particularly to a method and system for allowing efficient communications across disparate networking technologies such as Asynchronous Transfer Mode (ATM) and Ethernet.

2. Description of the Related Art

Network technologies are not homogeneous. End-to-end connections can span multiple networking technologies, for example, Ethernet, asynchronous transfer mode (ATM), frame relay (FR), multi-protocol label switching (MPLS), and Internet protocol (IP). In addition, an Ethernet network may include multiple customer edge devices, switches, and routers. These components may communicate using different protocols, spanning the various layers of the OSI interworking model (e.g., L1-L7). For example, routers communicate using a layer three (L3) protocol while the switches communicate using a layer two (L2) protocol.

While solutions have been proposed to allow the transport of data between end points supported by disparate technologies, such solutions are typically inefficient and inadequate solutions such as encapsulation and data extraction and simple repacketizing. These solutions fail to consider or address the preservation of aspects of the data transport environment such as quality of service, prioritization, etc. For example, class of service bits in an Ethernet frame are ignored and/or dropped when current technologies convert or encapsulate the data for delivery on the ATM portion of the network.

In addition, while standards such as Request for Comment (RFC) 2684 for the pure encapsulation of Ethernet frames for transport over ATM networks exist, these standards and their implementations do not address important aspects of networking such as service and parameters mapping, QoS as well as the ability to capitalize on efficient networking opportunities such as multiplexing several Ethernet connections on an ATM virtual channel connection (VCC).

It is desirable to have an internetworking solution which allows the transport of ATM network originated data to an Ethernet-based destination, and vice-versa, in a manner which preserves, throughout the network, networking features associated with the originating networking technology.

SUMMARY OF THE INVENTION

The invention describes an architecture and methods that enable network interworking between Ethernet and ATM networks with single or multiple QoS levels, with different levels of performance guarantees. Network interworking enables end users to communicate using different networking protocols, without performing any specific protocol interworking functions. The architecture provides flexibility in the location and functions of the internetworking function device, and describes methods for direct interworking or interworking over other network technologies.

According to one aspect, the present invention provides an interworking device for supporting network interworking between an Ethernet communication network and an ATM network, in which the interworking device includes a first network interface operable to communicate with the Ethernet communication network using an Ethernet communication protocol. A second network interface is operable to communicate with the ATM communication network using an ATM protocol. A processing unit is in communication with the first network interface and the second network interface, in which the processing unit encapsulates frames received from the Ethernet network into ATM frames, decapsulates frames received from the ATM network to recover Ethernet frames and maps parameters corresponding to the received one of the ATM and Ethernet frames into the other of the ATM and Ethernet frames. The mapped parameters include connection configuration control plane information and data plane parameters corresponding to individual frames.

According to another aspect, the present invention provides a method for interworking between an Ethernet communication network and an ATM network, in which frames received from the Ethernet network are encapsulated into ATM frames. Frames received from the ATM network are decapsulated to recover Ethernet frames. Parameters corresponding to the received one of the ATM and Ethernet frames are mapped into the other of the ATM and Ethernet frames. The mapped parameters include connection configuration control plane information and data plane parameters corresponding to individual frames.

According to yet another aspect, the present invention provides a storage medium storing a computer program which when executed by a processing unit performs a method for network interworking between an Ethernet communication network and an ATM network, in which frames received from the Ethernet network are encapsulated into ATM frames. Frames received from the ATM network are decapsulated to recover Ethernet frames. Parameters corresponding to the received one of the ATM and Ethernet frames are mapped into the other of the ATM and Ethernet frames. The mapped parameters include connection configuration control plane information and data plane parameters corresponding to individual frames.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2 is a block diagram of an ATM cell and an Ethernet frame;

FIG. 6A is a block diagram of another exemplary network architecture;

FIG. 6B is a block diagram showing the protocols implemented within the network architecture of FIG. 6A;

FIG. 7 is a diagram of an Ethernet-SSCS PDU format;

FIG. 8 is a diagram of a payload format for a bridged Ethernet/802.3 PDUs over ATM AAL-5 frames;

FIG. 14 is a table of ATM service categories;

FIG. 20 is a table of traffic parameter calculations using the parameters of FIG. 19;

FIG. 22 is a table of traffic parameter calculations using the parameters of FIG. 21;

FIG. 27 is a table showing an example of mapping between Ethernet p-bits and ATM VCCs;

DETAILED DESCRIPTION OF THE PREFERRED EMBODIMENTS

Architecture

Figure 1A:
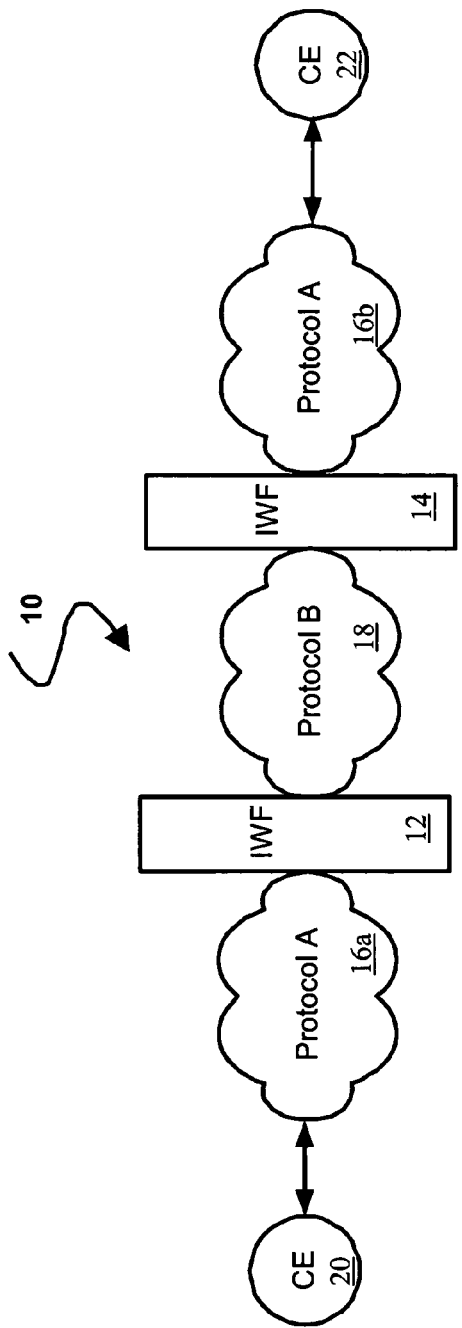
FIG. 1A is a block diagram of an interface between two networks with different protocols.

Referring now to the drawing figures in which like reference designators refer to like elements, there is shown in FIG. 1A, a system constructed in accordance with the principles of the present invention and designated generally as "10". System 10 includes three network segments connected by interworking function (IWF) devices 12 and 14. Two segments, networks 16a and 16b are coupled to IWF devices 12 and 14, respectively, and operate using the same network protocol A. The third segment, network 18, operates using different type of network protocol from that used by networks 16a and 16b. As is shown in FIG. 1A, a communication path is formed by network 16a, IWF 12, network 18, IWF 14 and network 16b. The protocols can include, for example, Ethernet, asynchronous transfer mode (ATM), frame relay (FR), multi-protocol label switching (MPLS), and Internet protocol (IP). Customer edge (CE) devices 20 and 22, for example, routers, switches, etc. are connected to network segments 16a and 16b, respectively, and serve to interface customer networks (not shown) to system 10. Router, switches, etc. for interconnecting a customer device or network to another network such as a service provider network are known in the art. In the most general sense, the IWF devices 12 and 14 provide interworking functionality and establish relevant parameters within protocol B (network segment 18) based on parameters within protocol A (network segments 16a and 16b).

As used herein, the term "network interworking" refers to the inter-working between networks using similar protocols, e.g., networks 16a and 16b, across an intermediary/core network, e.g., network 18. In network interworking, all or part of the protocol control information used in the two similar networks are transparently transferred by an interworking function across the intermediary/core network. As part of this function, the IWF encapsulates the information which is transparently transferred through the other disparate network. The interworking tasks are performed at IWFs 12 and 14 in a manner that is transparent to customer edge devices/end users. In general, as is described in detail below, IWFs 12 and 14 perform protocol encapsulation and mapping as well new header generation. Advantageously, this arrangement provides Layer 2 (L2) connectivity in a manner that allows the transport of multiple upper layer protocols such as Internetwork Packet Exchange (IPX), Standard Network Architecture (SNA), and the point-to-point (PPP) protocol, thereby minimizing/obviating the need for Layer 3 (L3) routing such as internet protocol (IP) routing. Further, the present invention maps service and parameters, maintains QoS aspects and provides a way to multiplex multiple Ethernet connections on an ATM connection.

Figure 1B:
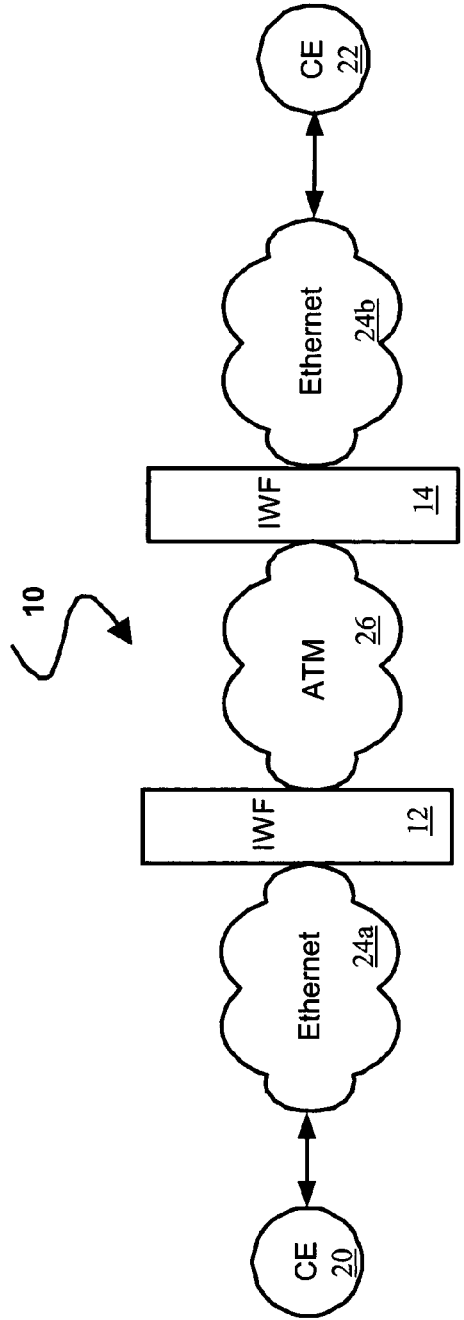
FIG. 1B is a block diagram of a system having an Ethernet network segment and an ATM network segment.

Referring to FIG. 1B, a particular example of a system 10 including three network segments, 24a, 24b and 26, connected by two IWF devices 12 and 14 is shown. IWF device 12 is disposed between the edges of an Ethernet network 24a and an ATM network 26. IWF device 14 is disposed between the edges of an Ethernet network 24b and the ATM network 26. Networks 24a and 24b include connections to customer edge devices such as devices 20 and 22. IWF devices 12 and 14 can be stand alone computing devices arranged to implement the functionality described herein or can be integrated as part of other networking components such as routers and switches as are known in the art. If implemented as a stand alone computing device, IWF devices 12 and 14 include a processing unit, memory, input and output interfaces as well as network communication interfaces as may be implemented by one of skill in the art to implement the functions described herein.

Referring to FIG. 2, the format of an ATM cell 40 and the format of an Ethernet frame 42 such as may be transported on Ethernet networks 24a and 24b and ATM network 26 are shown. The ATM protocols include an adaptation layer above the ATM cell switching layer, which provides a suitable interface between the variable length application protocol data units (PDUs) and the ATM layer. The adaptation layer is structured into the segmentation and reassemble (SAR) sublayer, the common part convergence sublayer (CPCS), and the service specific convergence sublayer (SSCS). The most common adaptation layer used for data communications is the ATM Adaptation Layer 5 (AAL5), which performs frame segmentation and reassembly into/from ATM cells and other functions such as error checking of the assembled frame. The ATM cell 40 includes a 5 byte cell header 44 and a 48 byte data portion 46. The cell header 44 includes bits/bytes for generic flow control (GFC), a virtual path identifier (VPI), a virtual connection indicator (VCI), a payload type (PT), the CLP and header error control (HEC). The AAL5 frame format (not shown) includes 4 bytes CRC, 2 bytes length field, 2 bytes control field, 0-47 bytes padding, and a variable length user data field. Of note, the terms "cell" and "frame" are used interchangeably herein when referring to ATM structures and arrangements.

As is readily seen in FIG. 2, the format of an Ethernet frame 42 differs from that of the ATM frame 40. The tagged Ethernet frame 42 includes a six octet MAC destination address 64, a six octet MAC source address 66, a two octet 802.1Q tag type 68, a two octet VLAN tag 70, a two octet length/protocol type field 72, and a four octet FCS field 76. In addition to the addressing and service information, a 46-1500 octet data unit 74 is included in the tagged Ethernet frame 42. Of note, the VLAN tag 70 includes a user priority, also known as "p-bits". Of note the preamble and start-of-frame delimiter field (SFD) applicable to IEEE 802.3 specific media are not shown because they are not included as part of the Ethernet traffic parameters. It should also be recognized that IEEE 802.3 Carrier Sense Multiple Access with Collision Detection (CSMA/CD) is used as an example and that the present invention is applicable to other media types defined by other framing arrangements, such as IEEE 802.11 wireless, etc.

When a packet or frame is forwarded between networks 24a and 26, the IWF device 12 encapsulates the protocol used in one network, and translates and/or maps its protocol control information to that of the protocol used in the other network. Such functions include mapping service classes between Ethernet and ATM networks, mapping parameters between these networks, calculating overhead between Ethernet and ATM frames as well as managing flow control using combinations of ATM congestion indication and/or Ethernet p-bits, all of which are described below in detail. Mapping of protocol information is supported between Institute of Electrical and Electronics Engineers (IEEE) 802.3 or Ethernet V2 frames, with or without Q-Tag (VLAN awareness) specified in 802.1Q, and the ATM header. This is done for the data plane and control plane, both of which are described below in detail. In general, the control plane includes configured or signaled information that determines the overall behavior, mappings, resource allocation and forwarding parameters that can be applied to all connection frames or frames of a service class. Such information is typically established and used to set up the network devices before any payload traffic is transmitted. Data plane refers to the frame processing functions that typically take place in real-time on a frame-by-frame basis.

Figure 3:
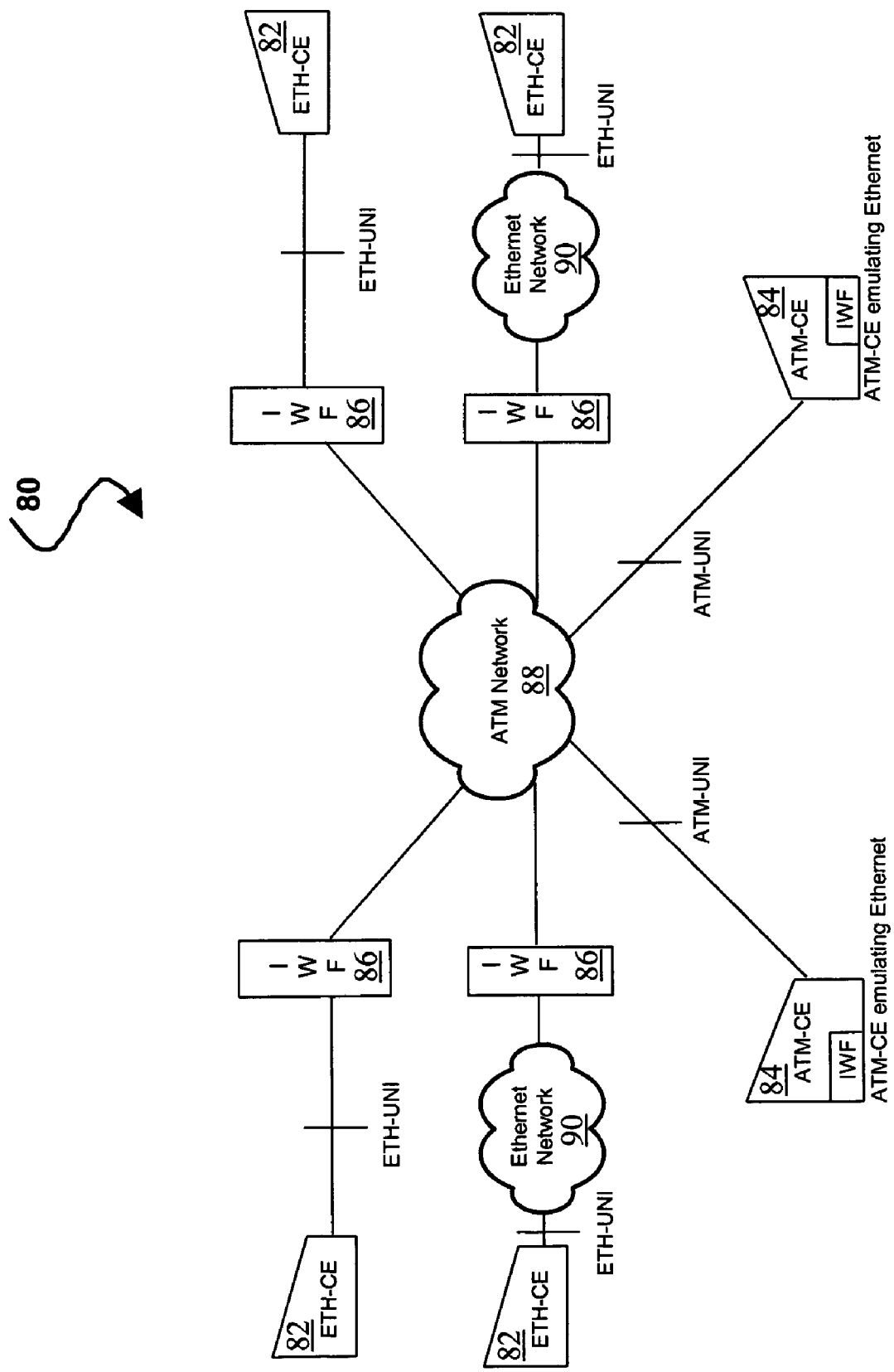
FIG. 3 is a block diagram of a network architecture constructed in accordance with the principles of the present invention.

An architecture suitable for encapsulation and/or translation constructed in accordance with the principles of the present invention is described with reference to FIG. 3. Referring to FIG. 3, a network architecture 80 is shown in which the IWF can be located at any of a plurality of locations within the network. The architecture 80 includes Ethernet customer edge devices 82 and ATM customer edge devices 84. ATM customer edge devices 84 are arranged as is known in the art to emulate Ethernet. IWF devices 86 serve as the interface to connect Ethernet customer edge devices to ATM network 88 directly, or via an Ethernet network 90.

Figure 4A:
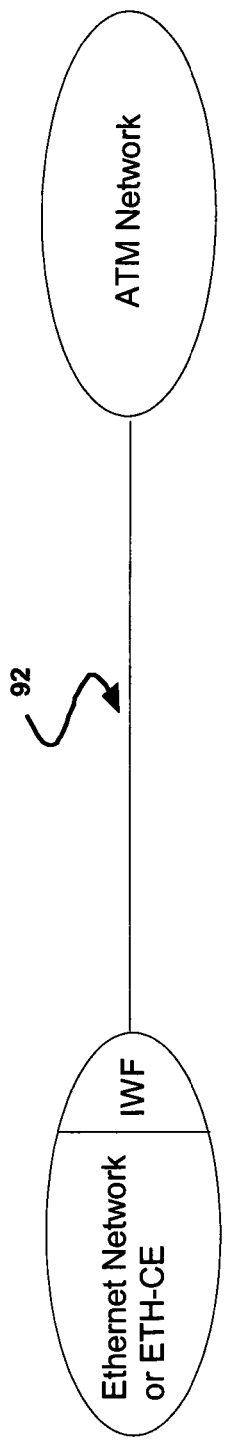
FIGS. 4A-4C are diagrams showing exemplary locations for the placement of an interworking function of the present invention.
Figure 4B:
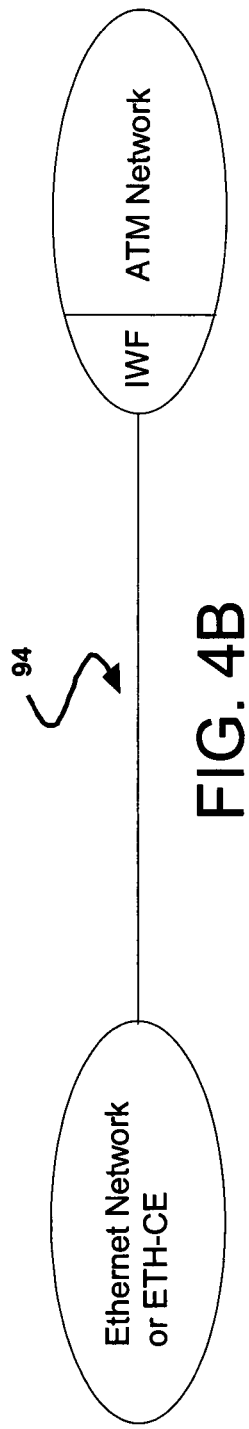
Figure 4C:
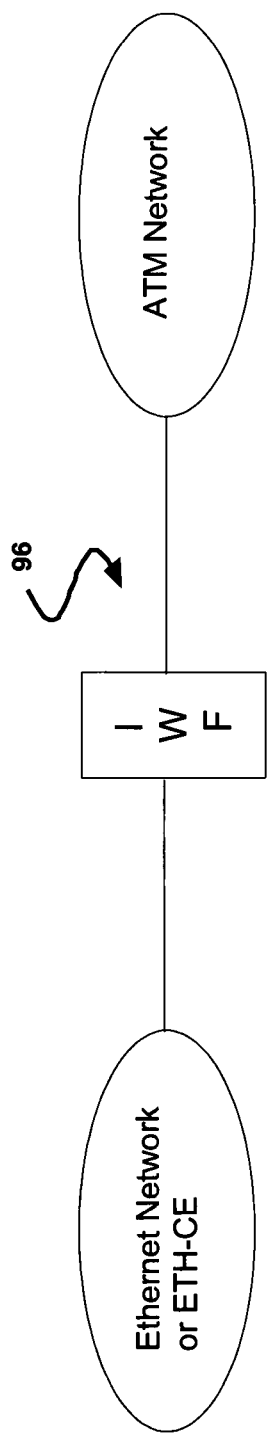

In addition, it is contemplated that the IWF can physically reside in the ATM customer edge device 84. Referring to FIGS. 3 and 4A-C, it can readily been seen that the IWF can be provided as a set of functions within the Ethernet or ATM networks, or can be a device that physically connects the Ethernet network to the ATM network. FIGS. 4A-4C show equivalent implementations of the IWF. FIG. 4A shows an arrangement 92 in which the IWF is included as part of the Ethernet network. FIG. 4B shows another arrangement 94 in which the IWF is included as part of the ATM network. FIG. 4C shows still another arrangement in which the IWF is a separate entity from both the Ethernet and the ATM networks. These arrangements provide significant interworking flexibility. The chosen configuration in any particular network will depend on several factors such as equipment cost and capabilities (both on the network and customer sides), current network deployment, and network evolution strategy.

Figure 5A:
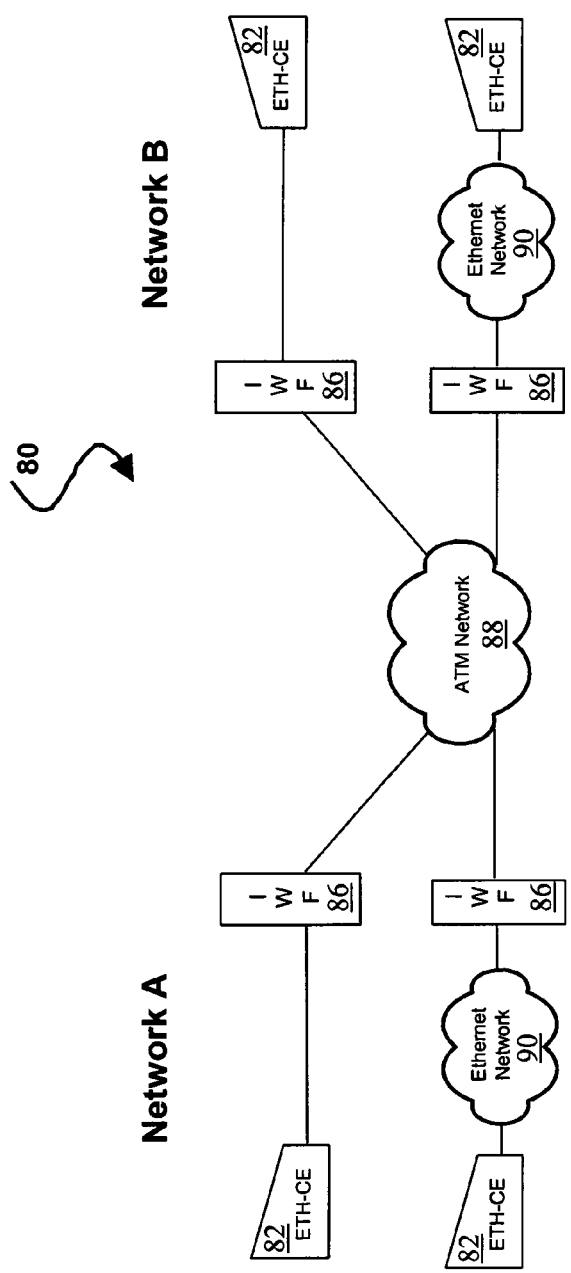
FIG. 5A is a block diagram of an exemplary network architecture.
Figure 5B:
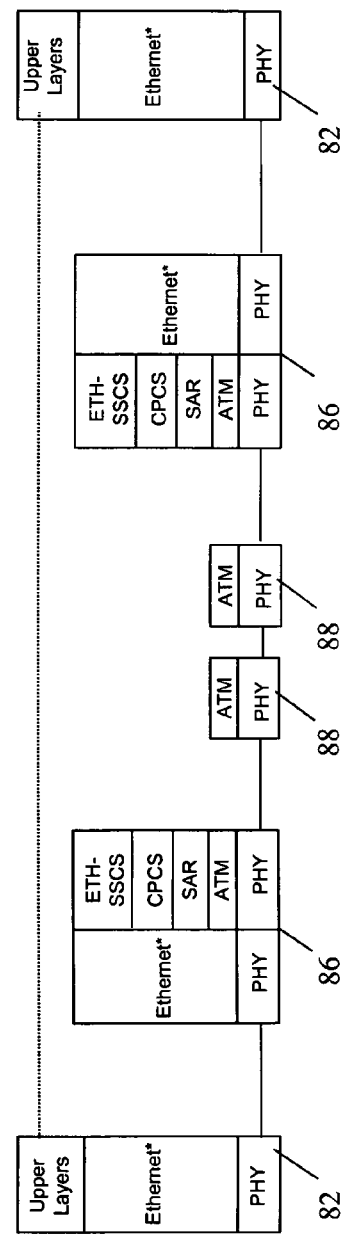
FIG. 5B is a block diagram showing the protocols implemented within the network architecture of FIG. 5A.

FIGS. 5A and 5B are referenced to provide a protocol-based perspective of an exemplary implementation of the present invention. FIG. 5A shows a subset of the diagram provided in FIG. 3. FIG. 5B shows a protocol-based view of the architecture of FIG. 5A taken from a customer edge device 82 in Network A to a customer edge device 82 in network B via IWFs 86 and ATM network 88. As is shown in FIG. 5B, the devices are interconnected to provide a physical path from Ethernet CE device 82 in Network A to another Ethernet CE device 82 in Network B. The ATM-based elements (network 88 and a portion of IWFs 86) also include an ATM cell switching layer and ATM adaptation layer protocol stack arranged to support the native ATM protocol. In accordance with the architecture shown in FIGS. 5A and 5B, the end user does not see or have any interaction with the use of ATM. The IWFs 86 provide all mapping and encapsulation functions to ensure that the service provided to the Ethernet customer edge devices 82 are unchanged by the presence of an ATM transport.

FIGS. 6A and 6B are referenced to provide a protocol-based perspective of an another exemplary implementation of the present invention. FIG. 6A shows another subset of the diagram provided in FIG. 3. FIG. 6B shows a protocol-based view of the architecture of FIG. 6A taken from a customer edge device 82 in Network A to an ATM customer edge device 84 in network B via a single IWF 86 and ATM network 88. As is shown in FIG. 6B, the devices are interconnected to provide a physical path from Ethernet CE device 82 in Network A to an Ethernet emulating ATM CE device 84 in Network B. The ATM-based elements (network 88, a portion of IWF 86 and an ATM customer edge device 84) also include an ATM cell switching layer and an ATM adaptation layer protocol stack arranged to support the native ATM protocol, e.g., an ATM cell switching layer and AAL-5 adaptation layer. In accordance with the architecture shown in FIGS. 6A and 6B, the end user does not see or have any interaction with the use of ATM. ATM CE device 84 supports the Ethernet to ATM IWF in its protocol stack. The IWF 86 and the IWF within the emulating ATM CE device 84 provide all mapping needed to ensure that the service provided to the Ethernet CE device 82 is unchanged by the presence of an ATM transport.

Of note, the asterisk next to the term "Ethernet" in IWF 86 and Ethernet CE devices 82 in FIGS. 5B and 6B refers to the ability of the present invention to support both virtual local area network (VLAN) aware and VLAN unaware Ethernet options. VLANs and the concepts employed by virtual networking are known in the art. In general, VLAN aware Ethernet includes packets arranged according to the base Ethernet standard, e.g. Institute of Electrical and Electronics Engineers (IEEE) standards 802.3N2 as well as a "Q-tag" under IEEE 802.1Q. Accordingly, the present invention is applicable to implementations of VLAN unaware (use only of base Ethernet 802.3N2) Ethernet networks as well as VLAN aware Ethernet networks.

The Ethernet Service Specific Convergence Sublayer (Ethernet-SSCS) uses a protocol data unit (PDU) format identical to IEEE 802.3N2 with the optional 802.1Q tag and without the preamble and SFD fields (a total of 8 octets). An example of an Ethernet-SSCS PDU format is shown in FIG. 7. PDU format 100 includes a 2 octet PAD data field 102 and MAC destination address 104, as well as an optional LLC header 106, depending on the encapsulation type, and an optional 4 octet LAN FCS 76. PDU format 100 also includes the remainder of the MAC frame 110.

In accordance with RFC 2684, LLC encapsulation is needed when one or more than one protocol might be carried over the same virtual connection (VC). FIG. 8 shows an example for Ethernet over ATM encapsulation using LLC for a payload format for bridged Ethernet/802.3 PDUs over ATM AAL-5. In order to allow the receiver to process the incoming AAL-5 CPCS-PDU, the payload field includes information used to identify the protocol of the bridged/routed PDU. When LLC encapsulation is used, this protocol identification information is encoded in an LLC header placed at the front of the PDU being carried. Note that the padding field is required when the LAN FCS field is transported, but optional when the LAN FCS is omitted.

For LLC encapsulation, bridged PDUs are formed into packet 112 and encapsulated by identifying the type of the bridged media in the SNAP header. The presence of the SNAP header is indicated by the LLC header 113 value 0xAA-AA-03 and the OUI 114 value in the SNAP header is the 802.1 organization code 0x00-80-C2. The type of bridged media is specified by the two octet PID 116. The PID also indicates whether the original frame check sequence (FCS) 76 is preserved within the bridged PDU. Of course, the specific fields and codes are provided merely by way of example, and the invention is not limited solely to the described embodiment.

Figure 9:
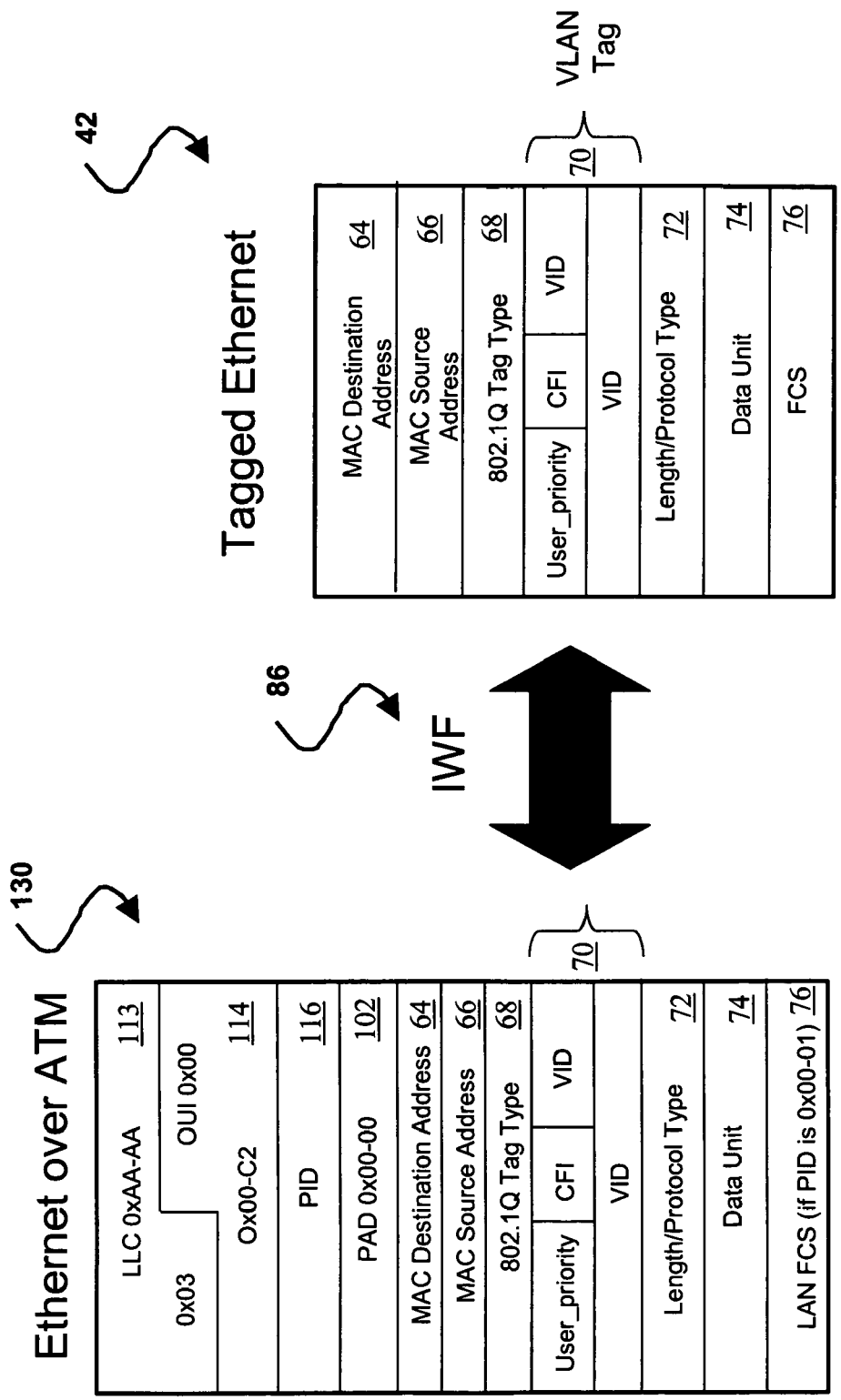
FIG. 9 is an example of an Ethernet frame encapsulated in an ATM AAL5 frame.

Referring to FIG. 9, an Ethernet over ATM encapsulation format is shown. The IWF performs RFC 2684 LLC encapsulation of Ethernet over ATM, and mapping between the Ethernet frame and ATM fields. Techniques for encapsulation in accordance with RFC 2684 are known by those of skill in the art. Encapsulation of the Ethernet frame over ATM in accordance with the present invention is explained with reference to FIG. 9. As is readily shown, most of the fields in tagged Ethernet frame 42 are encapsulated within ATM AAL-5 frame 130. For example, MAC source and destination addresses 64 and 66 are carried transparently in frame 130. If applicable, the 802.1Q tag is also carried transparently. Of note, the device performing the IWF may perform Ethernet value-added functions such as interworking between tagged and untagged interfaces and VLAN to p-bits translation.

Figure 10:
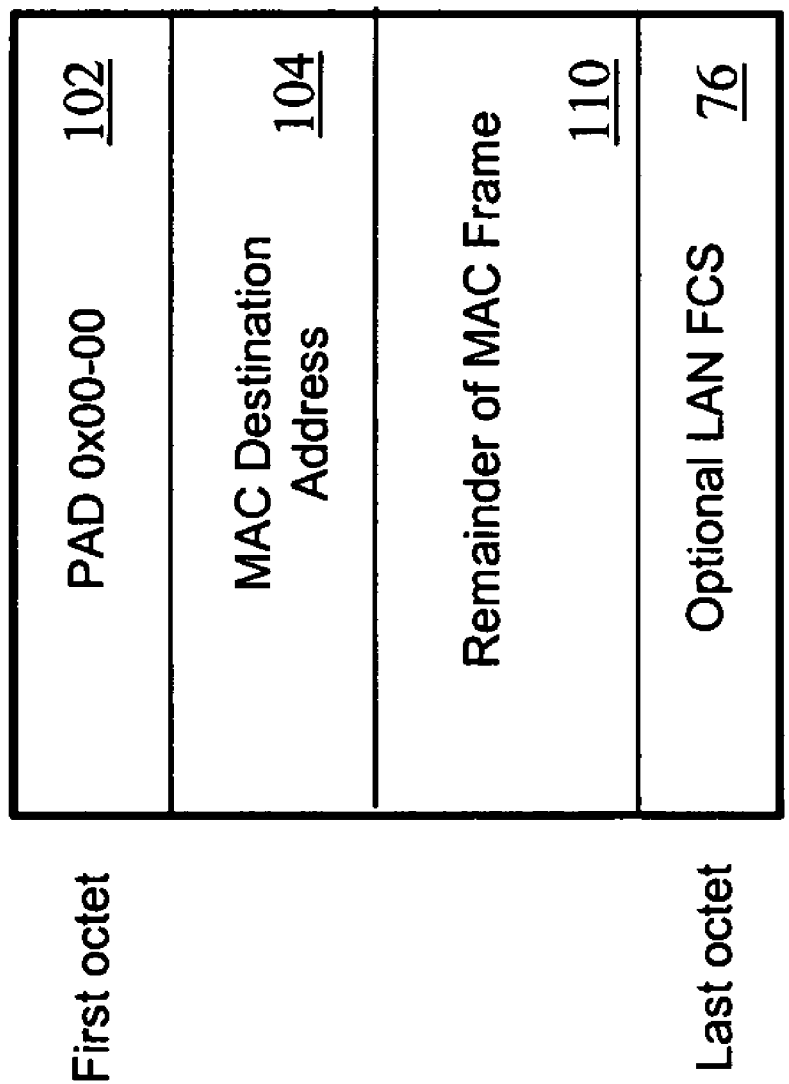
FIG. 10 is a diagram of a payload format for ATM virtual channel multiplexing of bridged Ethernet frames.

Bridged Ethernet frames can also be transported over ATM using the "VC multiplexing" method of RFC 2684. FIG. 10 shows a payload format for bridged Ethernet/802.3 PDUs over ATM AAL-5 carried by this method. The format shown in FIG. 10 is the same as described above, but omits LLC header 106. VC multiplexing creates a binding between an ATM VC and the type of network protocol carried on that VC. As such, there is no need for protocol identification information to be carried in the payload of each AAL-5 CPCS-PDU. This arrangement advantageously reduces payload overhead and reduces per-packet processing requirements. VC multiplexing can improve operating efficiency by reducing the number of cells needed to carry PDUs of certain lengths. For ATM permanent virtual connections (PVCs), the type of protocol carried over each PVC is predetermined based on configuration. For ATM switched virtual connections (SVCs), the negotiation protocol specified in RFC 1755 can be used.

The SAR and CPCS of AAL-5 in conjunction with the ATM layer provides frame segmentation and reassembly (frame delimiting) for Ethernet-SSCS PDUs. It is contemplated that an IWF 86 of the present invention can use the AAL-5 CPCS and SAR as specified in ITU-T Recommendation I.363.

Figure 11:
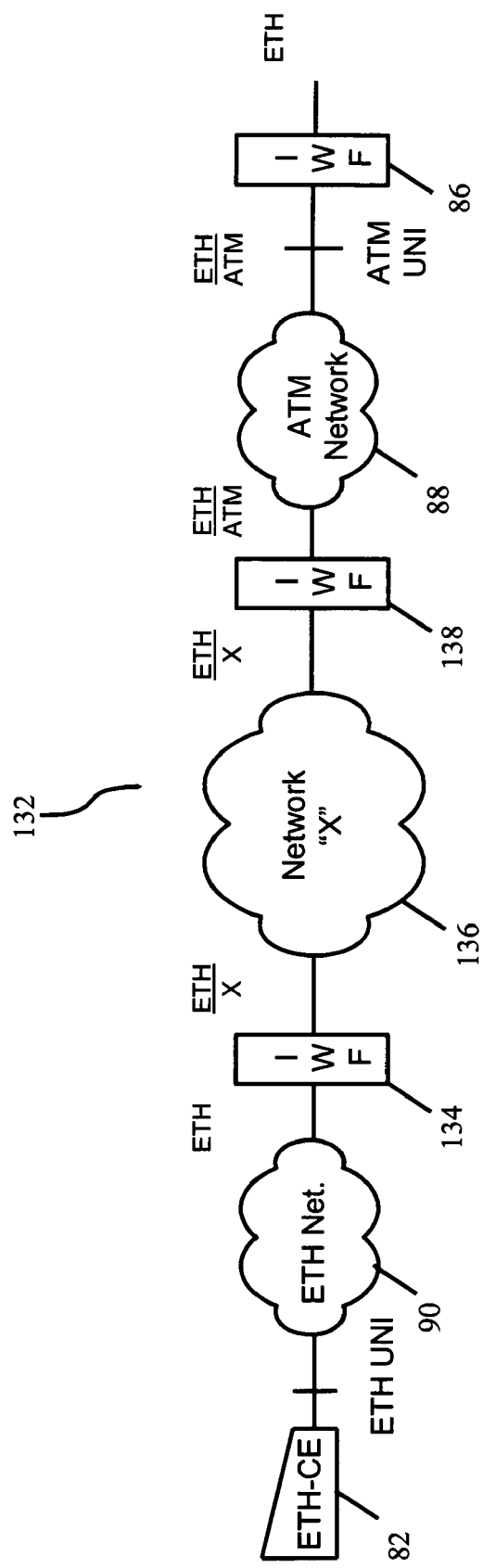
FIG. 11 is a block diagram showing the use of a third networking technology within the architecture of the present invention.

Referring to FIG. 11, it is also contemplated that the present invention can support network interworking via a third technology, shown as network 'X' 136 in architecture 132. For example, Ethernet to ATM network interworking can be achieved through a technology such as frame relay, where network X is a frame relay network. In this architecture, the IWF device 134 performs network interworking between the frame relay network 136 and the Ethernet network 90. A second IWF device 138 performs service interworking between the frame relay network 136 and the ATM network 88 as described in the MPLS/FR Alliance standard, FRF.8. A third IWF device, IWF device 86, performs network interworking between the ATM network 88 and an Ethernet network according to present invention (not shown). This allows end to end transport of data between the Ethernet customer edge device 82 and another Ethernet customer edge device (not shown). While in the example above, the interworking via a third technology includes a frame relay core, other core networks can be used. For example, the interworking could be achieved over an MPLS core. In the case where network 'X' 136 is an MPLS backbone network, IWF device 134 would perform ATM to MPLS network interworking and IWF device 138 would perform MPLS to ATM service interworking. It is also contemplated that IWF 138 can be implemented by two network interworking functions in tandem, performing Ethernet to MPLS network interworking followed by Ethernet to ATM network interworking.

Figure 12:
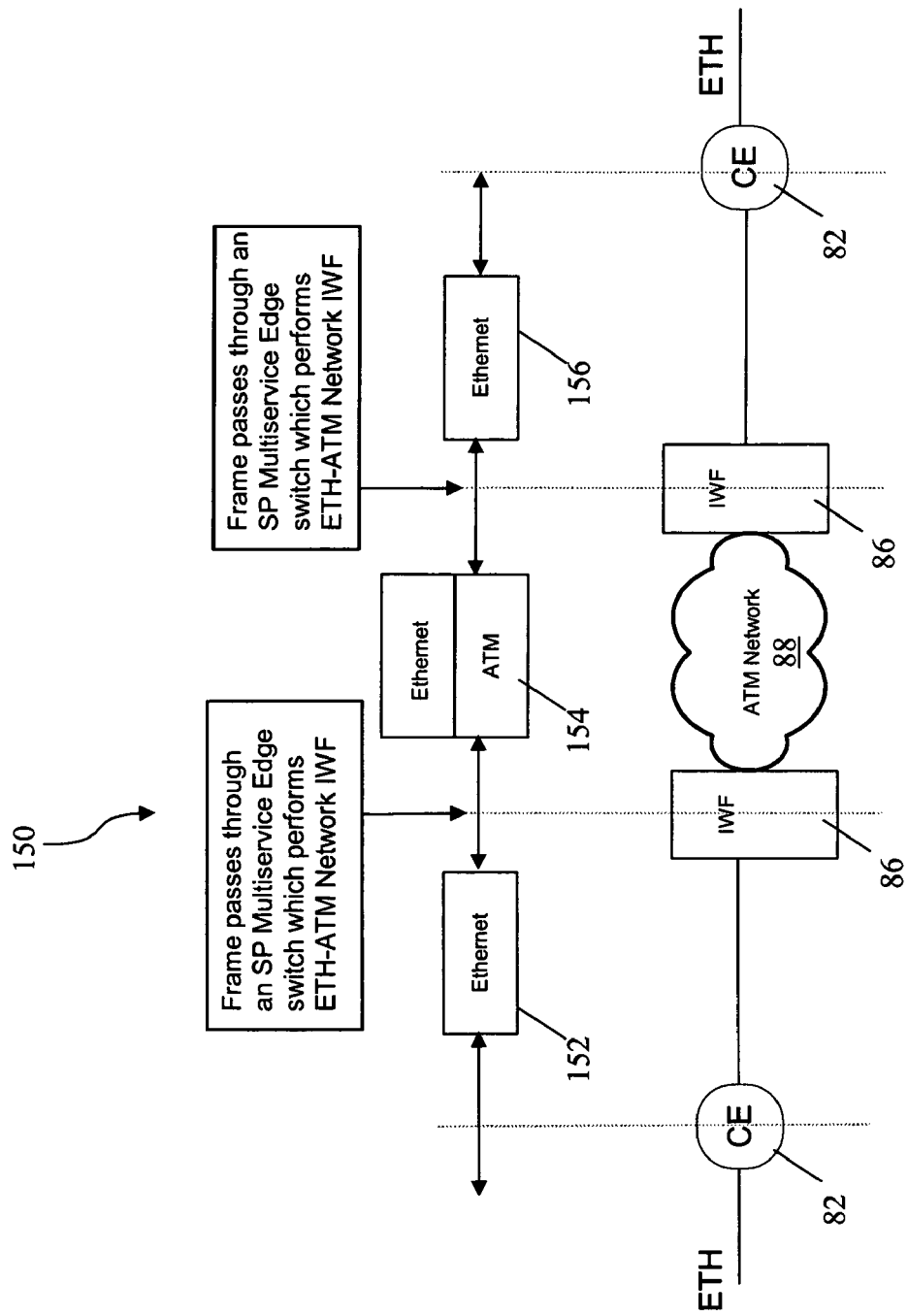
FIG. 12 is a block diagram of an exemplary network architecture showing exemplary steps for network interworking within this architecture.

Exemplary network interworking scenarios are described with reference to FIGS. 12 and 13. Referring to FIG. 12, an example architecture 150 that provides switch/router connectivity through L2 Ethernet using an ATM provider network 88 is shown. In this example, there is one provider with one network. The architecture 150 includes two Ethernet networks with CE devices 82 connected by an ATM network 88. Viewing from left to right on FIG. 10, an Ethernet frame 152 passes through a service provider (SP) multiservice edge switch 86 which performs an Ethernet to ATM IWF to create an RFC 2684 bridged mode compliant encapsulated frame 154. Encapsulated frame 154 passes through ATM network 88 and passes through another SP multiservice edge switch 86 which performs an Ethernet to ATM IWF to decapsulate and create Ethernet frame 156. Frames traveling in the opposite direction are treated in the same fashion.

Another scenario is described with reference to FIG. 13. Architecture 160 that provides switch/router connectivity through L2 Ethernet using an ATM provider network 88 and an Ethernet provider network 90 is shown. In this example, there is one provider with two networks. The architecture 150 includes an Ethernet customer network with an Ethernet CE device 82 connected to a service provider Ethernet network 90. On the other end, an ATM customer edge device 84 with Ethernet emulation is coupled to a service provider ATM network 88. ATM network 88 and Ethernet network 90 are connected to IWF 86.

Figure 13:
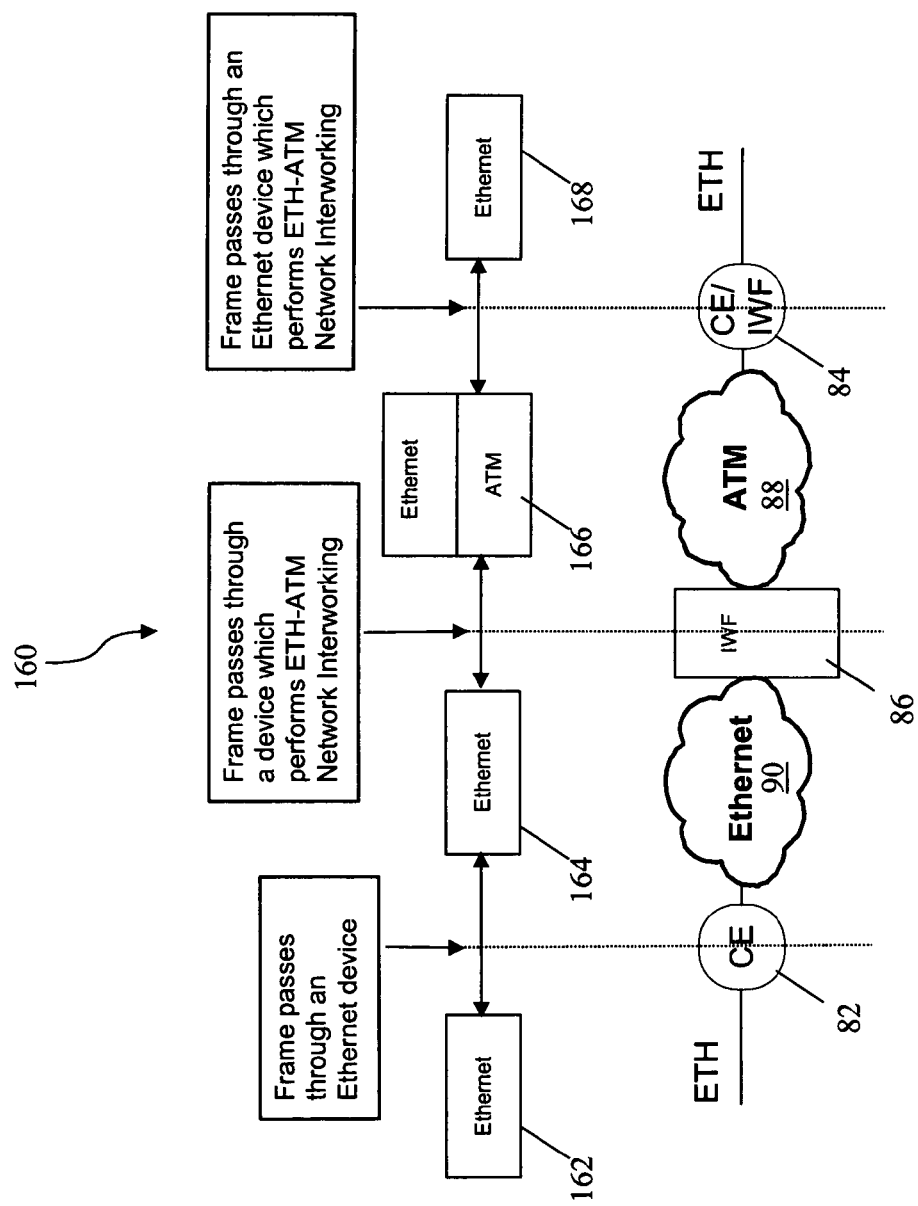
FIG. 13 is a block diagram of another exemplary network architecture showing exemplary steps for network interworking within this architecture.

Viewing from left to right on FIG. 13, an Ethernet frame 162 passes through an Ethernet CE device 82 onto service provider Ethernet network 90. The Ethernet frame, now Ethernet frame 164 passes through IWF 86 which performs Ethernet to ATM networking IWF to create an RFC 2684 bridged mode compliant encapsulated frame 166. Encapsulated frame 166 passes through ATM network 88 and passes through the ATM customer edge device 84 with Ethernet emulation which performs an Ethernet to ATM IWF to decapsulate and create Ethernet frame 168 frames traveling in the opposite direction are treated in the same fashion with device 84 creating the RFC 2684 compliant encapsulated frame 166.

As another scenario, it is contemplated that this methodology can be readily extended to the architecture shown and described above with respect to FIG. 13. The IWF can be implemented as a separate unit, as part of a CE device or as part of a provider edge (PE) device such as a provider-owned router or switch. It is also contemplated that the IWF can be implemented at the network to network interface (NNI) between provider networks. For example, in the case where the provider network is based on Metro Ethernet Forum (MEF) standards as are known in the art, the present invention can be implemented by extending these standards to allow the deployment of the IWF in the PE device, such as a PE device that interfaces an ATM CE to the service provider Ethernet network. In the case where the provider network is an ATM Network, the PE device including the IWF is one that interfaces an Ethernet CE device to the provider ATM network.

In both cases, the ATM VCCs are mapped to corresponding Ethernet Virtual Connections (EVCs), described below in detail.

While FIGS. 1-13 describe embodiments of architectures for ATM to Ethernet interworking, other network configurations and interworking scenarios are possible. In each configuration, the interworking may include the mapping of service, traffic parameters, and quality of service (QoS) indications. With the architecture of the present invention described above with respect to FIGS. 1-13, the remainder of this document is arranged as follows. Ethernet services supported by the present invention are described next. Following Ethernet services is a description of ATM services supported by the present invention. Interworking functions for a single class of service arranged in accordance with the present invention follows. Interworking functions for multiple classes of service arranged in accordance with the present invention are described. Finally, arrangements and methods for multiplexing connections are described.

Ethernet Services

Ethernet services supported by the present invention can include well-defined classes with different levels of service, such as Gold, Silver, Bronze, having different frame loss, delay, and jitter guarantees. As used herein, an EVC is a collection of Ethernet frames that are classified and grouped together for the purpose of interworking with ATM. EVC frames may include all Ethernet frames arriving at an Ethernet port (or on multiple Ethernet ports as described in the multiplexing section later), or frames belonging to one or more VLANs if the frames arrive on a VLAN aware interface. EVCs are bidirectional point-to-point connections which allow asymmetrical bandwidth profiles in the different directions. An EVC can support single or multiple service classes. This arrangement advantageously allows bandwidth to be optionally defined on a per class of service (CoS) basis. An EVC can be based on the Ethernet port, the Ethernet port and one or more VIDs, one or more MAC source and destination address pairs, or the MAC source, destination address and one or more VIDs.

An EVC can be associated with one or more bandwidth profiles and with one or more forwarding treatment rules for its frames. From a quality of service (QoS) perspective, a single QoS EVC provides a single bandwidth profile and a single forwarding treatment for all frames within the EVC. A multiple CoS EVC provides a single bandwidth profile and multiple forwarding treatments for all frames within the EVC. A multiple QoS EVC provides multiple bandwidth profiles and multiple forwarding treatments for all frames within the EVC. The bandwidth profile is used for resource reservation and allocation, admission control and traffic policing and is a control plane function, described below in detail. The forwarding treatment indicates scheduling and discard treatment of the frame. Forwarding treatment is specified by the per hop behavior (PHB) assignments to the frame and is based on EVC type, and of OSI protocol Layer 1-7 fields. Forwarding treatment is a data plane function, described below in more detail. PHB is an indication of the forwarding treatment applied to a frame and indicates a frame per-hop scheduling class (PSC) and drop precedence (DP), where higher DP frames are discarded before lowed DP frames in a congestion condition. Bandwidth profile and forwarding treatments are independent from one another in accordance with the present invention. Frames with different service classes can be combined with the same bandwidth profile or assigned to separate bandwidth profiles.

The IEEE 802.1Q Tag in a tagged Ethernet service frame (see FIG. 2) includes p-bits in the frame header. These p-bits can be used to identify nodal behavior and determine the forwarding treatment received by the Ethernet frame. Such nodal behavior includes expedited forwarding, assured forwarding, and default forwarding. The present invention provides a number of options for supporting and identifying the Ethernet frame service class behavior, e.g. scheduling, drop precedence and expected performance.

As one option, Ethernet frame service class and drop precedence can be identified using Ethernet L2 indicators only. The most common fields are the p-bits, but other L2 indicators such as the CFI bit, source and destination MAC addresses and VLAN ID can be used. This option is suitable for pure Ethernet L2 networks, and has the advantage of being simple and independent from the upper layer protocol (ULP) carried by the Ethernet frame.

As another option, the more general multi-field classification that spans any of the Layer 1 to Layer 7 protocol layers can be used, either individually or in combination. For example, if the frame is carrying IP traffic, this option can use the IP protocol information such as the protocol type, IP source and destination addresses, differentiated services code point and/or TCP/UDP port numbers.

As used herein, Ethernet per-hop-behavior (PHB) data is defined as the per-hop scheduling class (PSC) data plus the drop precedence data. Additional information regarding Ethernet PHBs can be found in the inventors' pending U.S. patent application Ser. No. 10/868,536, entitled ETHERNET DIFFERENTIATED SERVICES, the entirety of which is incorporated herein by reference. The basic principle is that each incoming Ethernet frame is assigned a PHB which specifies forwarding treatment of the frame by edge and core network nodes. Generally, PSC is synonymous with a service class or service, but it is contemplated that multiple PSCs can be combined into a single service class. If single service is supported, all frames are treated and mapped equally by the IWF, irrespective of the interface being VLAN-aware or VLAN-unaware and the presence/absence or encoding of the p-bits.

Alternatively, a single service per port/VID could be supported based on the VID or p-bits value on VLAN-aware interfaces. If multiple services are supported by the Ethernet connection, multiple traffic contracts/parameters may be specified independently for each service (traffic contracts can be used for traffic policing, resource reservation/admission control, and SLAs). In effect, each service can be treated independently like a separate sub-connection.

ATM Services

ATM virtual connection cell transfer and discard priorities can be established based on the ATM connection service category and the CLP indication. ATM services typically include well-defined classes as described above, which can be used for supporting services such as gold, silver, bronze. Each service is distinguished with different parameters. FIG. 14 is a table 180 showing the relationship between ATM service categories and parameters. Table 180 includes ATM layer service categories 182 and ATM parameters 184. ATM parameters 184 include traffic parameters 186 and QoS parameters 188 which themselves include various combinations of parameters for peak cell rate (PCR), cell delay variation tolerance (CDVT), sustained cell rate (SCR), maximum burst size (MBS), minimum desired cell rate (MDCR), maximum frame size (MFS), cell delay variation (CDV), cell transfer delay (CTD) and cell loss ratio (CLR). These individual parameters are known in the art and are not further described herein. ATM service layer categories 182 are either "specified", "unspecified" or are not applicable (N/A) for these various combinations of parameters 184.

In accordance with the present invention, Ethernet services should be mapped to an equivalent ATM service. For example, an Ethernet service class should be mapped to an ATM service class with the same performance expectations in terms of loss, delay, and jitter.

When single service is supported, all frames are treated/scheduled equally by the IWF. The treatment is determined by Control Plane rules, which may be configured or signaled to indicate the ATM service category. Multiple service classes can be supported on a single ATM VCC, in a value-added non-standard manner. In this case, the frame CoS indicators are used to derive the frame PHB. The CoS indicators can be based on multi-field or behavior aggregate classification. The ATM AAL-5 frame per-hop-behaviors may be based on the p-bits, CFI, and IP DSCP, individually or in combination. The per-hop-behaviors determination may alternately or additionally use the MAC address, IP addresses, IP protocol Type, TCP/UDP port number, or any other L1-L7 fields individually or in combination.

Network Interworking Functions

In accordance with the present invention, functions performed by an IWF include control plane functions and data plane functions. As noted above, control plane functions are based on configuration and/or signaling data. An exemplary control plane function is the connection mapping between an EVC and the ATM virtual channel connection(s) (VCC). Control plane functions also include bandwidth profile mapping between Ethernet and ATM connections. Control plane functions also define the rules for the data plane functions, for example, the mapping/interpretation of the p-bits to the Ethernet PHB, congestion and discard eligibility mapping, etc.

Data plane functions are those that effect the treatment of the user frames and are typically implemented as real-time functions. Exemplary data plane functions including changing the protocol header between Ethernet and ATM, forwarding the frame to the chosen connection/queue and scheduling the connection onto the outgoing link. By way of example, assume an EVC carries VID 5, with a single bandwidth profile. The Ethernet frames received are classified with gold, silver or bronze performance depending on the setting of the p-bits (or other Layer 1-Layer 7 classification as described above). The EVC is mapped to an ATM VCC by the IWF or to multiple ATM VCCs, depending on the network option. The CoS can be asymmetrical.

Single COS

Figure 15:
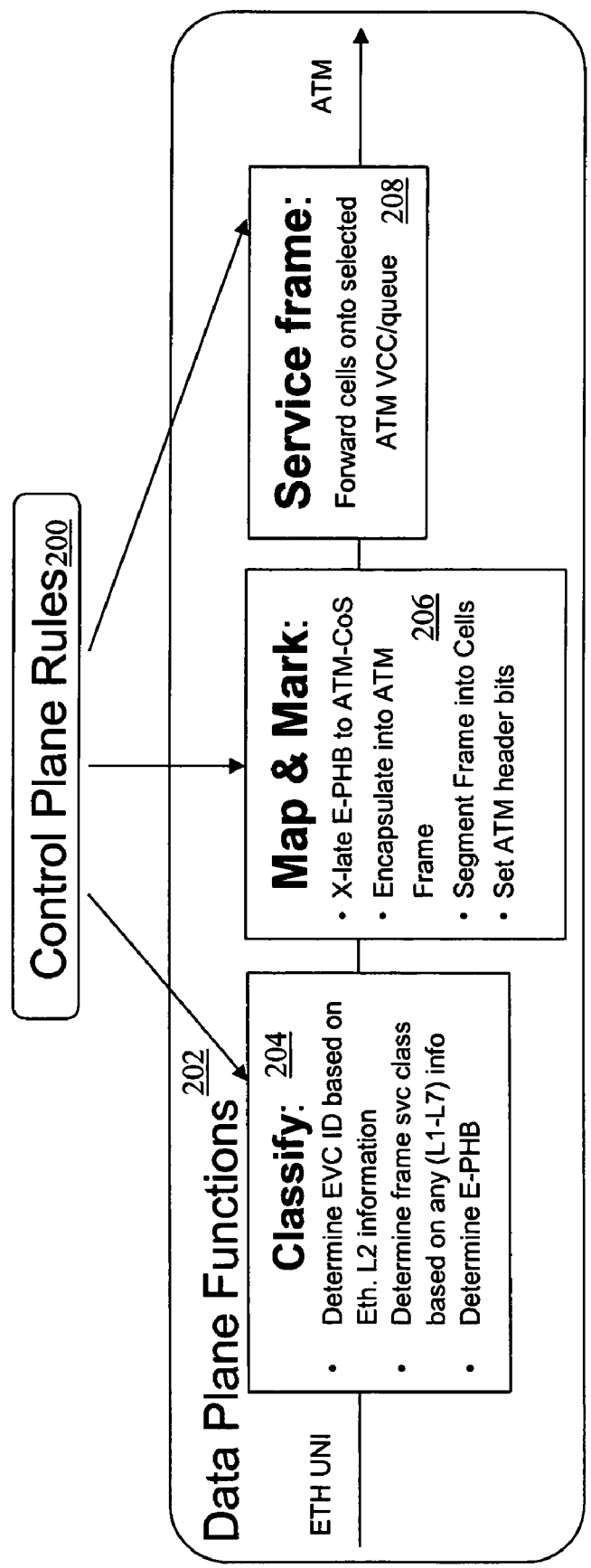
FIG. 15 is a block diagram of Ethernet to ATM control plane rules and data plane functions.

Referring to FIG. 15, the IWF performs both control plane and data plane functions. For single CoS support, there is one-to-one mapping between an ATM connection and an Ethernet virtual connection. An Ethernet virtual connection is typically identified by a port(interface) and/or one or more VLANs in which the EVC-ID is mapped to an ATM VCC identifier (VCC). In addition, the IWF maps the drop precedence (DP) and congestion indications (CI) from Ethernet to ATM.

As is shown in FIG. 15, control plane rules 200 in the IWF control data plane functions 202. In the Ethernet to ATM (ingress) direction, when an Ethernet frame arrives at the IWF, the Ethernet frame is classified 204 to (1) determine the EVC ID based on the L2 Ethernet information, (2) determine the frame CoS based on any Layer 1-7 information and (3) determine the Ethernet PHB.

The Ethernet frame is mapped and marked 206 to (1) translate the Ethernet PHB to an ATM CoS, (2) encapsulate the frame into an ATM frame, (3) segment the frame into cells and (4) set the ATM header bits, e.g. the CLP and EFCI bits. The marked and mapped frame is then serviced 208 to forward the frame onto the selected ATM VCC and to schedule the frame for transmission on the ATM link. The exact functions performed by the IWF for each of these steps can vary. Control plane rules specify the functionality.

The IWF compliments the Metro Ethernet Network (MEN) edge data plane and control plane functions. Data plane functions 202 are compatible with the Metro Ethernet Forum (MEF) E-UNI functions of classification, metering and marking, which assign an EVC-ID and a CoS-ID/PHB to the Ethernet frame in which the PHB determines the scheduling treatment (PSC) and DP of the frame. Control plane functions for a session include mapping the EVC and its bandwidth profile to a corresponding ATM connection that best meets the performance objectives associated with the EVC.

Figure 16:
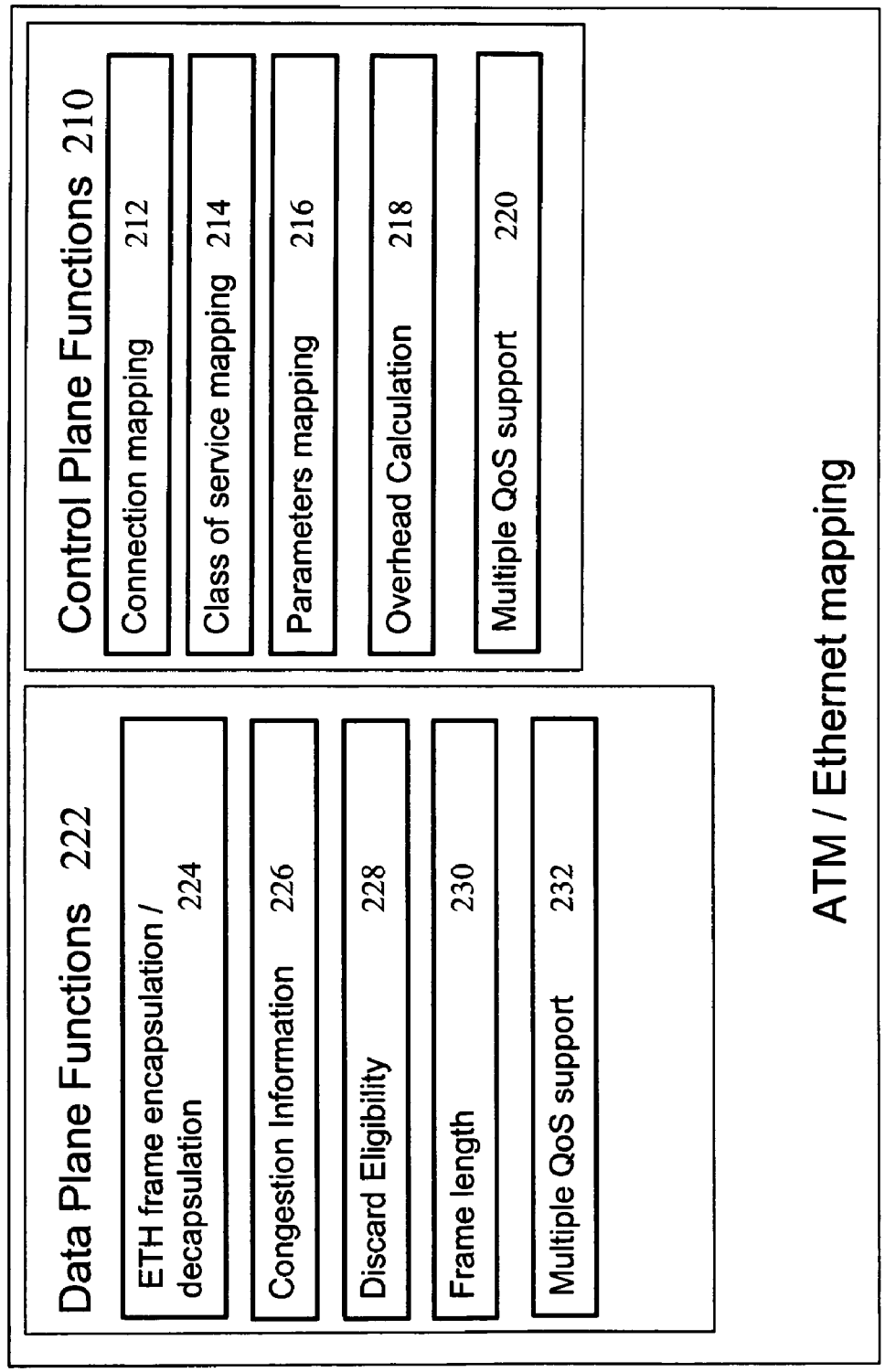
FIG. 16 is a block diagram of ATM to Ethernet mapping parameters.

Referring to FIG. 16, interworking between an Ethernet network and an ATM network can include mapping multiple functions in both the control plane and the data plane. The control plane functions 210 use configuration and/or signaling information that typically take place before any traffic is sent, and applies to all/many frames of a particular flow/connection. The control plane functions 210 support interworking and CoS functions such as connections set-up/mapping, traffic policing configuration, connection admission control and network resource reservation and allocation. These functions are categorized as connection mapping 212, CoS mapping 214, traffic parameters mapping 216 and overhead calculation 218. Support for multiple CoS 220 is discussed below in detail.

Figure 17:
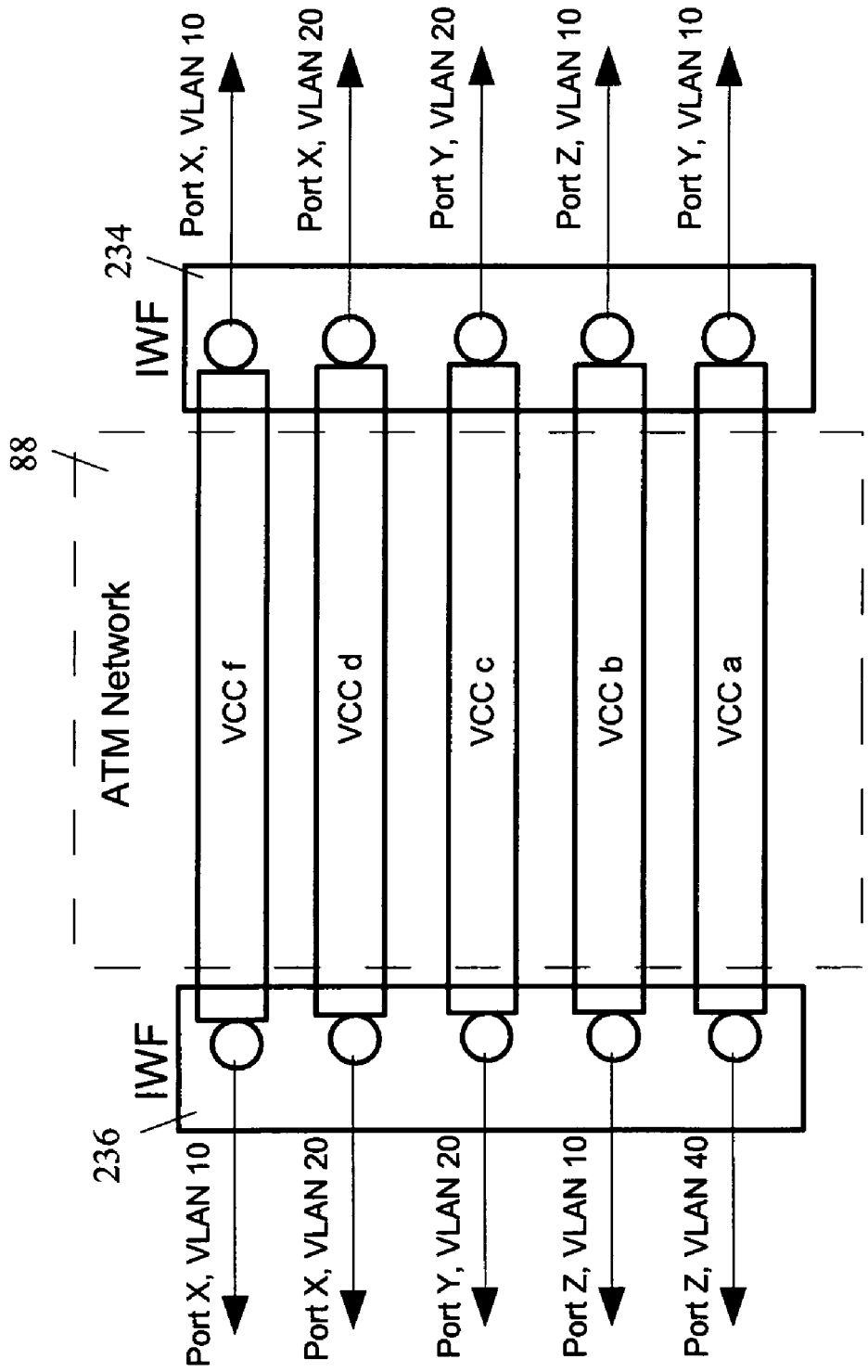
FIG. 17 is a block diagram of VLAN connection mapping and transport.
Figure 18:
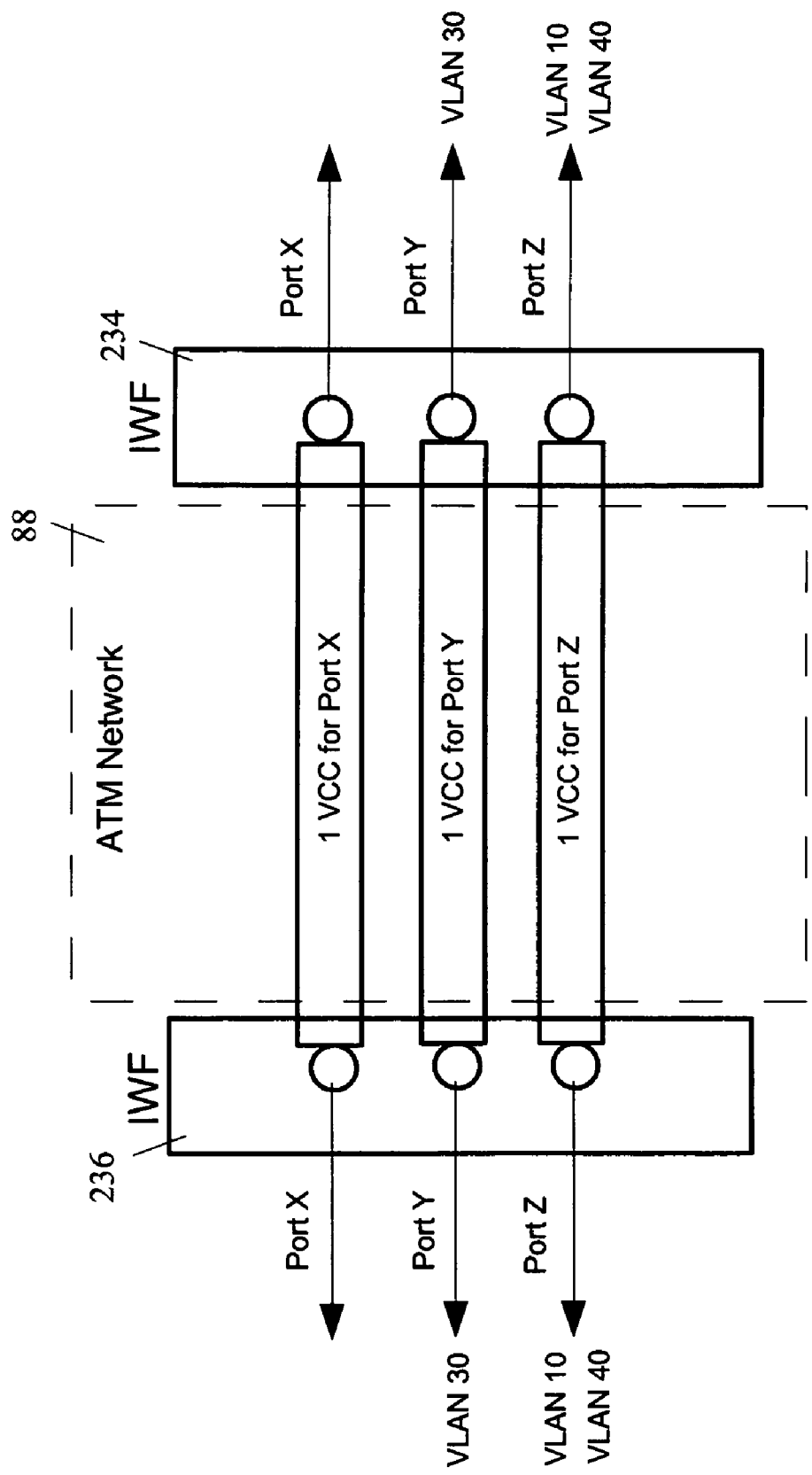
FIG. 18 block diagram showing an example of a one to one interworking function port transport.

Connection mapping function 212 is described with reference to FIGS. 17 and 18. For single CoS support, the IWF maps all EVC frames to the same single ATM VCC and all frames receive the same CoS treatment. In operation, the EVC-ID is mapped to the ATM VCC (VPI/VCI) by the ingress IWF in the Ethernet to ATM direction and the ATM VCC (VPI/VCI) is mapped back to the EVC-ID at the egress IWF. As noted above, Ethernet value-added functions as are known in the art can be performed on the Ethernet user to network interface (UNI) side of the provider edge devices.

An example of VLAN connection mapping and transport is explained with reference to the diagram in FIG. 17. An IWF 234 and an IWF 236 are connected to an ATM network 88. In this example, five VLANs are transported between IWF 234 and IWF 236. Each VLAN is assigned a separate EVC and mapped to a separate ATM VCC. This arrangement advantageously allows ports/VLANs to be switched to different destinations. In addition, because separate VCCs are used, isolation between VLANs in the ATM core is provided, thereby improving security and bandwidth guarantee for each VLAN. As is shown in FIG. 17, the VLAN ID need not be preserved from origin to destination.

An example of one to one IWF port transport is explained with reference to the diagram in FIG. 18. In this example, three Ethernet ports are transported between IWF 234 and IWF 236. Each port x, y and z can optionally support the 802.1Q tag and can carry 1 or more VLANs. In this example, each port is assigned a separate EVC and is mapped to its own ATM VCC. This arrangement allows for network scalability and is compatible with legacy Ethernet interfaces that do not support VLANs. However, unlike the example of FIG. 17, all VLANs within a port are bundled together and must travel between the same pair of IWFs. As shown in FIG. 18, VLANs 10 and 40 are transported through ATM network 88 in the VCC assigned to port Z. A third example (not shown) provides multiple, but not all, VLANs on the same port being mapped to a single EVC and mapped to a single ATM VCC (referred to as bundling in MEF standards).

With respect to service class mapping (class of service mapping function 214) for a single CoS connection, the present invention supports mapping between ETH EVC and ATM VCC service classes. Service class mapping is performed to ensure that the IWF meets the service class objectives. For example, a gold Ethernet service should be mapped to an equivalent service on the ATM side and vice versa. Alternate mappings are permitted to allow for cases where the Ethernet and ATM service classes do not match. Service class mapping sets the data plane functions of the IWF during frame processing.

More specifically, and by way of a non-limiting example, as shown in FIG. 14, ATM standards, such as ITU-1.371 and ATM Forum Traffic Management Version 4.1, AF-TM-0121.000 (March 1999), support services that are differentiated by their QoS parameter expectation in terms of cell loss and delay. Accordingly, Ethernet services should be mapped to the corresponding ATM service category. For example, a premium service should be mapped to an ATM CBR or rt-VBR service with the same performance expectations and delays.

Figure 19:
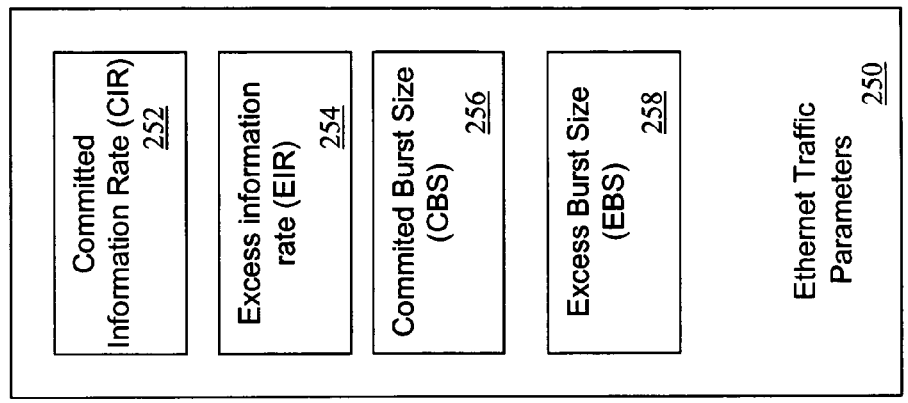
FIG. 19 is a block diagram of Metro Ethernet Forum traffic parameters.

Traffic parameters mapping is discussed with reference to FIGS. 19-22. Referring to FIG. 19, a set 250 of Ethernet parameters for a one-to-one mapping of an EVC to an ATM VCC. Traffic parameters may be used by many QoS functions: traffic policing and monitoring, BW reservation, admission control, and scheduler configuration. The standard ATM traffic parameters are described above with reference to FIG. 14. Of note, PCR and CDVT are defined for all service categories. SCR and MBS are defined for the VBR services only and MDCR is defined only for the UBR+ service. The standard Ethernet traffic parameters are shown in FIG. 19 as Ethernet traffic parameters 250 which can be based on the Metro Ethernet Forum Standard. The Ethernet traffic parameters 250 include committed information rate (CIR) 252 in bits per second, excess information rate (EIR) 254 in bits per second, committed burst size (CBS) 256 in bits, and excess burst size (EBS) 258 in bits. Other units may be used such as bytes/octets. The four Ethernet parameters described above are set independently. Also, as used herein "AR" refers to the Ethernet Access Rate.

Referring to FIG. 20, when a mapping function is set between an ATM and an Ethernet connection, the IWF device calculates the traffic parameters. In the Ethernet to ATM direction, the parameters for the ATM network can be calculated using the Ethernet traffic parameters 250 (shown in FIG. 19). As is shown in box 262, $PCR_{0+1}=CIR+EIR$ (ATM traffic shaping is recommended if the traffic is policed downstream in the network), or, as a conservative option, $PCR_{0+1}=AR$. In either case, CDVT is configured. Additionally, for all VBR services, as is shown in box 264, $MBS=CBS/(1-CIR/AR)+1$. For VBR.1, as is shown in box 266, $SCR_{0+1}=CIR$. For VBR.2 and VBR.3, as is shown in box 268, $SCR_0=CIR$. For the UBR+ service category, as is shown in box 270, $MDCR=CIR$. Resulting rates which are greater than the ATM link rate should be capped at the ATM link rate. The original Ethernet connection parameters are restored for frames traveling from Ethernet to ATM.

Figure 21:
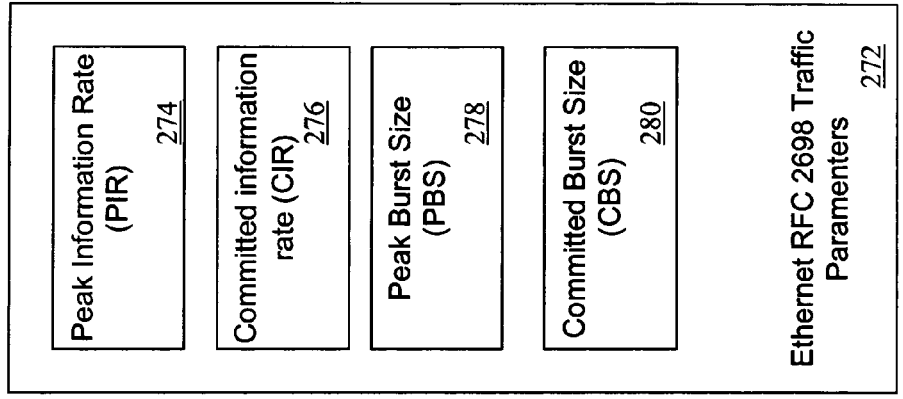
FIG. 21 is a block diagram of Ethernet RFC 2698 traffic parameters.

Referring to FIG. 21, a set of RFC 2698-based Ethernet traffic parameters 272 are shown. RFC 2698-based Ethernet traffic parameters 272 include peak information rate (PIR) 274, committed information rate (CIR) 276, peak burst size (PBS) 278, and committed burst size (CBS) 280. The four RFC 2698-based Ethernet parameters are set independently.

Referring to FIG. 22, as is shown in table 282 for the Ethernet to ATM direction, the parameters for the ATM network are set as shown in table 260 in FIG. 20 with one exception. That exception is that, unlike what is shown in box 262 in FIG. 20, in this alternative case, box 284 in FIG. 22 shows that $PCR_{0+1}=PIR$ (ATM traffic shaping may be required if the traffic is policed downstream in the network), or, alternatively, $PCR_{0+1}=AR$. If any of the resulting rates are greater than the ATM link rate, that resultant rate should be capped the ATM link rate. The original Ethernet connection parameters are restored for packets traveling from Ethernet to ATM.

In all parameter mappings above, a margin may be added to compensate for the increased jitter introduced by the IWF and intermediate network segments.

Overhead calculation function 218 (in FIG. 16) is discussed. Referring back to FIGS. 9 and 2, the Ethernet and ATM AAL5 encapsulated frame formats are different. Excluding the preamble and the SFD, the Ethernet header length ($h_E$) is 22 bytes if the MAC FCS is preserved or 18 bytes if the MAC FCS is not preserved. The header length is reduced by 4 bytes for untagged Ethernet frames. The ATM header includes fields in the ATM frame other than the data field.

The IWF encapsulates the MAC frame starting at the MAC Destination Address and uses this information as the payload of the AAL-5 CPCS-PDU. AAL-5 adds two types of overhead, namely, an AAL-5 trailer ($h_{trailer}$) of 8 bytes and AAL-5 SAR overhead of between 0 and 47 bytes. Of note, the AAL-5 CPCS-PDU length must be an integer multiple of 48 bytes. Accordingly, the number of cells ($N_{cells}$) needed to transport 'm' bytes of data is Ceiling(($m+h_E+h_{trailer}$)/48). Recall that cell size, excluding overhead, is 48 bytes. $N_{cells}$ is therefore equal to the smallest integer that is greater than or equal to x where x is (($m+h_E+h_{trailer}$)/48).

A correction factor maps rates between Ethernet and ATM networks. Assuming a data length of 'm', the correction factor $a=N_{cells}*53/(m+h_E)$. In the Ethernet to ATM direction, Ethernet rate values are multiplied by 'a'. For example, SCR=a*CIR assuming that both SCR and CIR are expressed in the same bytes/second unit (note that SCR rate may be subsequently divided by the ATM cell size of 53 bytes to convert the rate to conventional ATM traffic unit of cells/second). In the ATM the Ethernet direction, the ATM rate values are divided by 'a', for example, CIR=SCR/a (or the original Ethernet traffic parameters are restored). Of note, this analysis does not include additional overhead due to RFC 2684 bridged mode encapsulation of Ethernet frames over ATM (for example, 8 bytes for LLC mode+2 bytes for padding). In addition, in the multiplexing case, described below, there is no explicit traffic parameters conversion. However, the formulae discussed can help With the connection admission control function for the multiplexing case.

As a specific example, assume a data unit length of n=20 bytes, a Q tagged Ethernet frame, and the FCS is preserved. $N_{cells}$=Ceiling((20+22+8)/48)=2. $N_{cells}$ also=2 with RFC 2684 LLC encapsulation because the additional 10 bytes ((20+22+8+10)/48) does not change the resultant calculation in this case. The number of ATM bytes needed to transmit 20 bytes of data unit information=2*53=106 bytes. The number of Ethernet bytes needed to transmit 20 bytes of data unit information=20+22=42 bytes. As such, the overhead factor 'a' is a=106/42=2.52.

The calculations are carried out in control plane (per connection), not for every frame. They are typically done in SW however they could also be completed by hardware or firmware configured to perform the appropriate functions.

Referring again to FIG. 16, data plane functions 222 are performed on every frame, typically in real time, and include examining and mapping/setting the frame header information, forwarding the frame through the network, possible frame discard, and the like. The control plane rules impact/configure the data plane functions 210, and are typically changed infrequently in non-real-time. The data plane functions can include, for example, Ethernet frame encapsulation over ATM by the ingress IWF and de-capsulation at the egress IWF (discussed above in detail) 224, congestion information 226, discard eligibility 228 and frame length 230, and provide functions to support multiple QoS 232.

Figure 23:
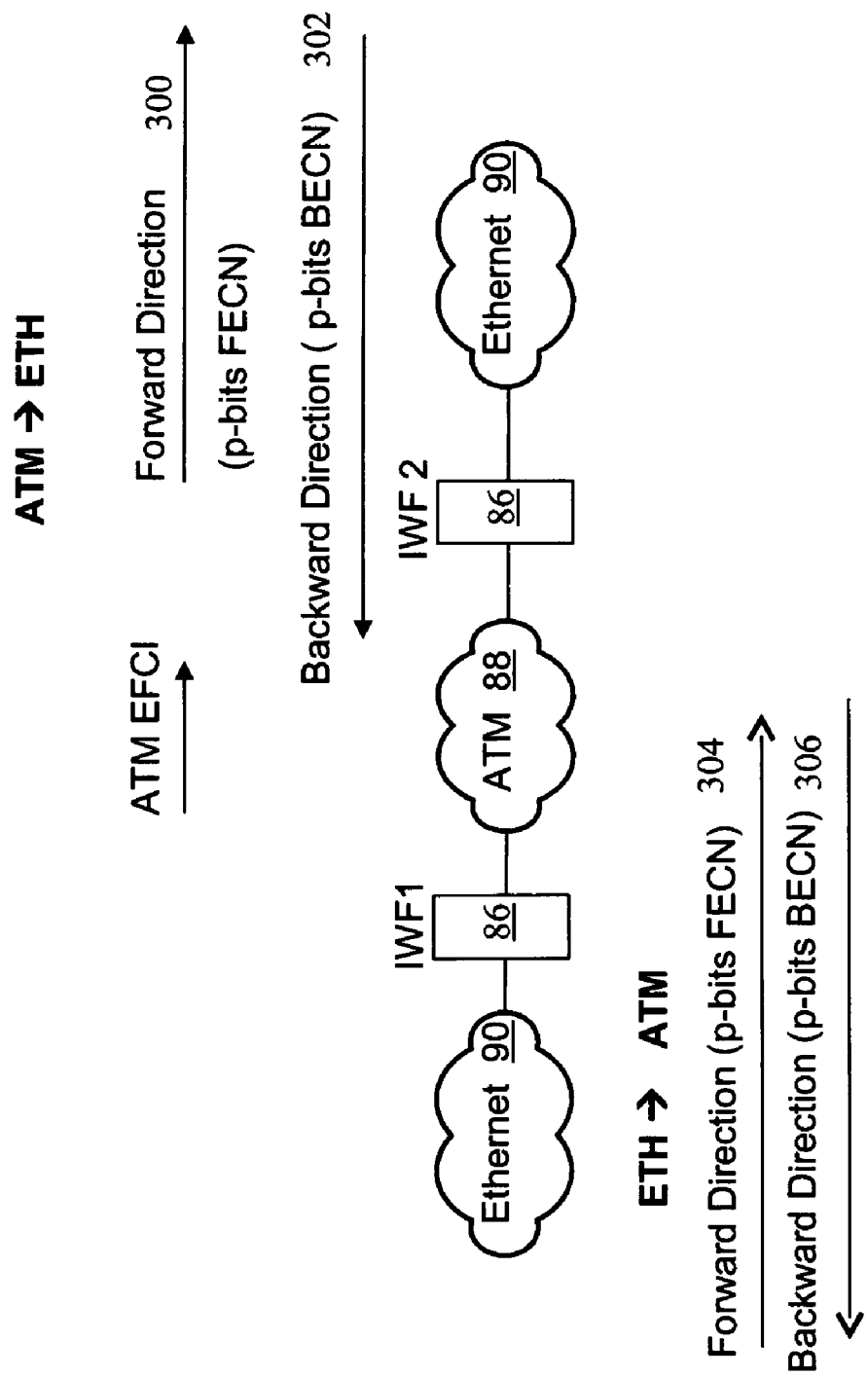
FIG. 23 is a block diagram showing congestion indications.

Referring to FIG. 23, a frame can include congestion indication options via congestion information function 226. ATM frames carry EFCI in the cell header. Mapping between the ATM network 88 and the Ethernet network 90 can be carried out, if the priority bits (p-bits) in a tagged Ethernet frame are assigned for carrying congestion information. Alternately or in addition, the congestion indication can be specified by the CFI field.

In the forward ATM to Ethernet, direction 300, the cell level EFCI field in the ATM cell is mapped to the frame level Ethernet FECN. If the EFCI field in the last cell of a received segmented frame is set to "congestion experienced", the IWF will set the p-bits FECN in the Ethernet frame to congestion experienced. In the backward direction 302, congestion indication may be supported only at the frame level by setting the Ethernet Backward Explicit Congestion Notification (p-bits BECN) field.

In the forward Ethernet to ATM direction 304, Ethernet level the p-bits FECN field is not mapped to the cell level EFCI. The Ethernet frame FECN field is copied unchanged into the FECN field in the Ethernet-SSCS PDU. The EFCI fields of all ATM cells are always set to "congestion not experienced". Optionally, the Ethernet p-bits BECN field is set in the frames traveling in the ATM to Ethernet direction to speed up user congestion notification. In the backward Ethernet to ATM direction 306, the BECN field in the Ethernet-SSCS PDU may be set to "congestion experienced" if (1) BECN is set in the Ethernet frame traveling in the Ethernet to ATM direction or (2) EFCI was set to "congestion experienced" in the last ATM cell of the last segmented frame received in the ATM to Ethernet direction for the subject bi-directional connection.

Referring back to FIG. 16, discard eligibility function 228 indicates frames to discard when the network is congested. Recall that the Ethernet PHB may indicate frame discard treatment, based on any L1-L7 protocol information. As another option, discard eligibility mapping can be restricted to tagged Ethernet frames which use the p-bits and/or the Ethernet CFI field to indicate discard treatment. Although this option is more limited than use of the Ethernet PHB, it is simpler to implement, especially in the case where the incoming Ethernet frames do not use/support rich classification functions. Also, this option is independent of the upper layer protocols.

The discard eligibility indication is a measure of the frame importance within a service/flow. The frame can be marked by the user, or set by the network policies based on the traffic contract and user sending rate. Discard eligibility can be mapped between the ATM frame and the Ethernet frame if discard eligibility is available on the Ethernet side. Discard eligibility on an Ethernet network can be included in p-bits or an equivalent mechanism such as the CFI field.

In the Ethernet to ATM direction, discard eligibility mapping is applicable if tagged Ethernet frames include p-bits and/or CFI for discard eligibility indication (or alternatively by an internal IWF indication, which may be based on a configured policy or the dynamic outcome of an attached/PE policing function). The p-bit/original drop precedence indication can be carried unchanged in the Ethernet header. As one option, the Ethernet frame drop precedence (p-bits indication) is mapped to ATM discard eligibility. The PHB can indicate up to three-drop precedences/colors. Metro Ethernet forum describes Ethernet frames as having a level of service indicated by a particular color. For example, green indicating conformant, yellow indicating excess, and red indicating traffic contract violation. The behaviors associated with the different colors can be mapped to particular discard eligibilities in the ATM frame. For example, for green Ethernet frames the IWF sets the CLP bits in all ATM cells of the frame to '0' and for yellow Ethernet frames the IWF sets the CLP bits in all ATM cells of the frame to '1'. Red frames are optionally dropped by the IWF or allowed to the network with CLP bits in all ATM cells of the frame set to '1'. As another option, the ATM CLP of every ATM cell generated by the segmentation process of the AAL-5 PDU containing the information of that frame is set to a constant 0 or 1 value as configured at service subscription time.

In the ATM to Ethernet direction, if one or more cells belonging to a frame has its CLP field set, the IWF will determine that the frame is discard eligible. This indication can be mapped to the Ethernet frame drop precedence indication if the p-bits are used for that purpose such that the discard eligibility bit can be mapped to one of the eight p-bits combinations, depending on Ethernet service definition (as described in "ETHERNET DIFFERENTIATED SERVICES" by Sameh Rabie, et. al U.S. patent application Ser. No. 10/868,536). Alternately, no mapping is performed from ATM to Ethernet. The original p-bits discard data are copied unchanged from the original Ethernet frames in a manner that is independent of CLP bits received at the ATM layer.

Another mappable data plane function shown in FIG. 14 is the frame length function 230. Frame length can also impact the forwarding treatment for the frame. The data field of the IEEE 802.3 frames is limited to 1518 bytes (1522 bytes for tagged frames). 'Jumbo' frames can be larger than 1518 bytes on non-VLAN-aware interfaces and can be larger than 1522 bytes on VLAN-aware interfaces. Typically, jumbo frame can be up to approximately 9K bytes. The IWF device drops ATM AAL-5 frames that exceed the maximum supported Ethernet length in the ATM to Ethernet direction. In the other direction, ATM AAL-5 standards specify Max MTU as 65K bytes, but different implementations and interfaces may support different values. For example, low-speed interfaces carrying multimedia traffic may have a smaller value. If the size of an Ethernet frame exceeds the ATM MTU the IWF drops the frame.

Multiple Classes of Service

Unlike standard ATM, a single Ethernet VLAN can support multiple CoS classes, for example premium, gold, and standard classes of services. Each class of service is identified by assigning a unique p-bit value to service frames. The EVC can be assigned a single bandwidth profile for the aggregate bandwidth for the whole EVC or be assigned multiple bandwidth profiles, i.e. a bandwidth profile for each service class or group of classes.

In the Ethernet to ATM direction, the ATM network can support multiple CoS using a variety of techniques. For example each class of service can be assigned a seperate ATM VCC. As another example, a single enhanced (non-standard) ATM VCC can be used in which AAL-5 frames are scheduled into multiple queues based on their CoS indication, e.g., based on the p-bits value or IP DSCP in the frame header, without frames interleaving. In the ATM to Ethernet direction, the original Ethernet frames are forwarded onto the destination Ethernet interface according to the Ethernet service class designation.

The IWF is arranged to support the various multiple CoS options for the EVC and match them to the ATM transport capabilities. The following describes extensions to the control and data plane functions described above as applied for supporting multiple CoS EVCs.

In the Ethernet to ATM direction for the multiple CoS case, the Ethernet CoS indicators are used to indicate the frame service class. The IWF data plane functions perform service class mapping in addition to all of the single CoS mapping functions described above (see FIG. 16). The control plane functions can include mapping of the EVC and its bandwidth profile(s) to the corresponding ATM connection(s) and their parameters. The arrangement for the ATM to Ethernet direction is similar.

Figure 24:
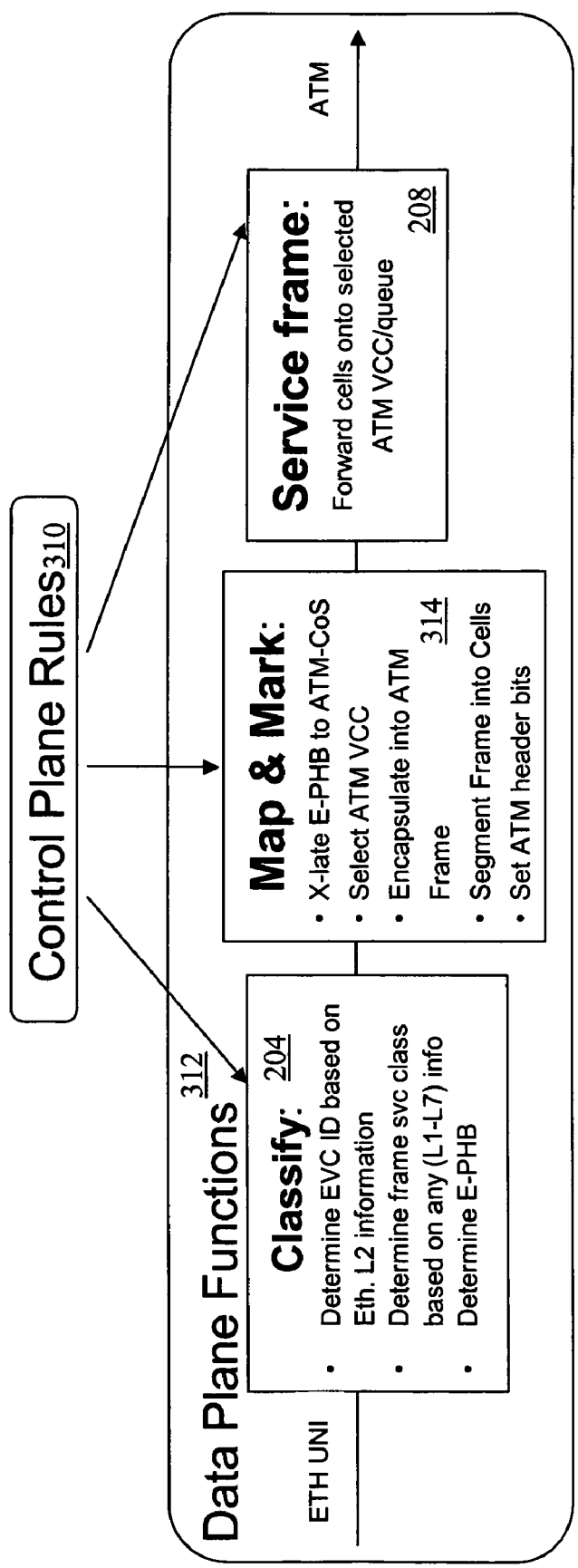
FIG. 24 is a diagram showing an exemplary typical network interworking process for multiple CoS implementations for frames being transported from an Ethernet network to an ATM network.

FIG. 24 is a diagram showing an exemplary typical network interworking process at the ingress IWF for multiple CoS implementations. As shown in FIG. 24, much of the process is the same as for single CoS implementations. Control plane rules 310, in the IWF, control data plane functions 312. In the Ethernet to ATM direction, the main difference from FIG. 15 and its description is the addition of an ATM VCC selection process in map and mark function 314.

Referring to FIG. 16, data plane functions 222 that are included in frame processing for multiple Ethernet service classes (CoS) are supported for each EVC. In the case where multiple ATM VCCs are used, the Ethernet frame service class is used to select the outgoing ATM VCC in the Ethernet to ATM direction. In general, the Ethernet frame service class can be determined based on the Ethernet header p-bits, the CFI field and/or other L1-L7 protocol layer information such as VID or IP DSCP.

In sum, in the Ethernet to ATM direction, control plane rules 310 are used to determine (1) how the Ethernet frame service class will be determined, (2) the mapping rules from Ethernet to ATM service classes and (3) the service classes associated with each ATM VCC. The incoming frame is processed by (1) determining the Ethernet frame service class, (2) mapping the Ethernet service class to the closest, i.e. corresponding, ATM service class and (3) forwarding the frame onto the ATM VCC that supports the mapped ATM service class. In the ATM to Ethernet direction, the ATM header/information is removed and the received frames are forwarded according to the original Ethernet service class.

With reference to FIG. 16, connection mapping function 212 for multiple CoS applications is described. For Ethernet EVC mapping to ATM, the EVC can be mapped to ATM using different methods depending on the extent of EVC CoS support, the ATM network capability and available CoS options. These options include (1) using a single legacy ATM VCC with a single CoS in the ATM core, (2) using multiple legacy ATM VCCs to support multiple CoS, e.g. gold, silver and/or bronze VCCs, and (3) using a single multi-CoS ATM VCC that is capable of supporting multiple CoS based on frame CoS indication such as the Ethernet P-bits or IP differentiated services.

Figure 25:
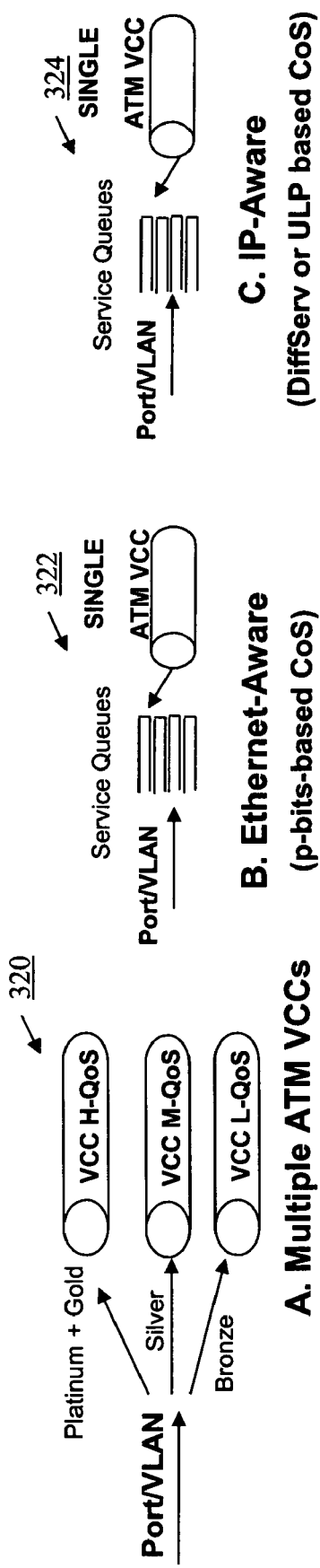
FIG. 25 is a diagram showing three examples of multiple CoS connection mapping.

FIG. 25 shows three examples of multiple CoS connection mapping. Example A 320 shows the case where multiple ATM VCCs can support one or more Ethernet service classes by mapping a port/VLAN to a level of service for a VCC. Example B 322 shows the case where a single ATM VCC can be used together with service queues having p-bit awareness, i.e. p-bit arrangements are mapped to a VCC queue. Example C 324 uses a single ATM VCC in which the service queue has awareness of the ULP or IP differentiated service. In the cases of Examples B 322 and C 324, traffic can arrive out of order, but traffic within each service class would arrive in order. A class-based scheduler should be used in these cases for scheduling the multiple service classes onto the single ATM VCC, without AAL-5 frames interleaving. As such, the ATM VCC CoS should be capable of supporting the highest Ethernet service class. It is also contemplated that an ATM VCC or group of VCCs can be replicated for load sharing and resiliency.

Figure 26:
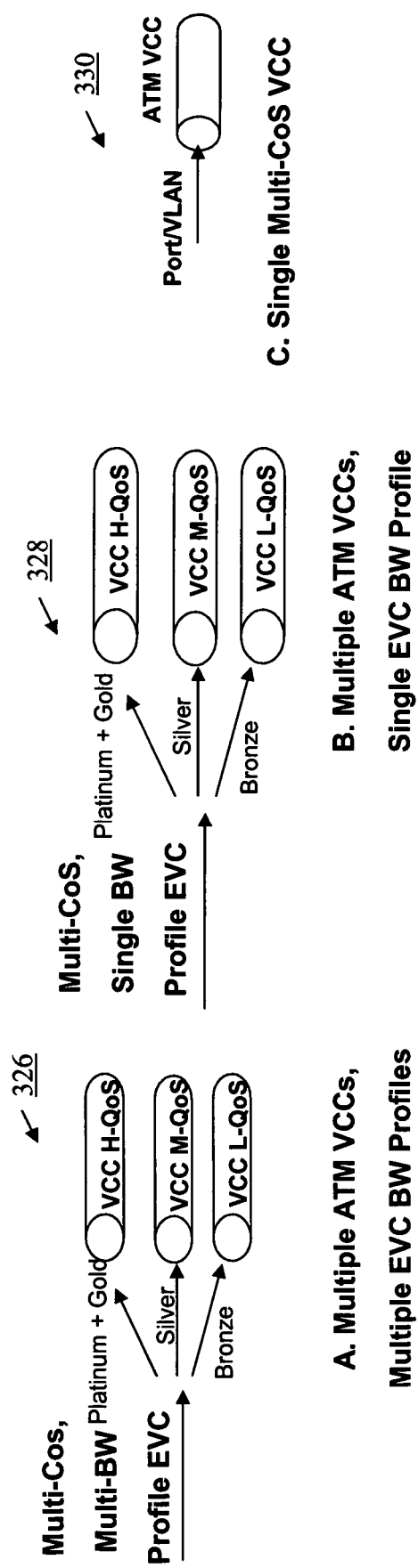
FIG. 26 is diagram showing three examples of bandwidth profile mapping in the Ethernet to ATM direction.

FIG. 26 shows three examples of bandwidth profile mapping in the Ethernet to ATM direction. In this arrangement, the bandwidth profile mapping will build on the parameter mappings and overhead calculations described above for single CoS EVC connections. Examples A 326 and B 328 are applicable when multiple VCCs are used. Example A 326 shows the case where multiple EVC profiles are used and each EVC bandwidth profile is mapped to a corresponding ATM VCC. Example B 328 shows the case where a single EVC bandwidth profile is supported by estimating the percentage of EVC traffic mapped to each ATM VCC. Single CoS parameter rules are applied separately to each EVC class/VCC pair.

Example C 330 shows the case where a single multi-CoS VCC is used. If there are multiple EVC bandwidth profiles, the EVC bandwidth profiles are aggregated before mapping to the ATM VCC bandwidth profile. If there is a single EVC bandwidth profile, the same rules as described above for the single CoS mapping are applied.

FIG. 27 shows an example of the flexibility provided by the present invention in mapping between Ethernet p-bits and ATM connections for different ATM connection QoS and CLP values. Table 340 shows an example where the Ethernet p-bits support five service classes, representing five forwarding classes, with some classes supporting multiple drop precedence values, and an ATM service that supports three services having various delay and loss guarantees. Although three ATM services are used in this example, it is contemplated that the present invention can be arranged to support any combination of ATM services and Ethernet service classes. In this example, the ATM CLP bit is used to represent drop precedence of the frames within a service class.

By way of example, row 342 shows the mapping of a "gold" Ethernet service class for an Ethernet PHB value of AF31, defined by p-bits value "110" to a real-time ATM service class assigned to ATM VCC ID 1, represented by ATM QoS CBR with the ATM CLP field set to "0".

In sum, for multiple CoS support for frames traveling in the Ethernet to ATM direction, (1) each Ethernet service class can be assigned to a separate ATM VCC, (2) a subset of the service classes can be mapped to a single ATM VCC or (3) all service classes can be mapped to a single ATM VCC. For example, an Ethernet connection that supports "gold" and "silver" services should be mapped to two ATM VCCs having matching CoS, with the "gold" and "silver" traffic parameters being mapped to the corresponding ATM VCC parameters. If two or more Ethernet services are combined into a single VCC, their aggregate traffic can be represented by a single traffic descriptor at the Ethernet and ATM sides. For frames traveling in the ATM to Ethernet direction, the original Ethernet frames are forwarded to the destination Ethernet interface or VLAN using the Ethernet CoS/service designation. Class-based scheduling/queuing are used for each egress Ethernet interface and/or VLAN to support priority treatment of higher Ethernet service classes. This is accomplished by using the EVC CoS parameters.

In sum, for transporting EVCs in the core ATM network, the connection is mapped, bandwidth profile mapping is performed, CoS mapping is performed. With respect to connection mapping, the core connection service classes should be able to support the performance requirements for the various EVC CoS classes, e.g. bronze, silver, and gold. Each EVC can be mapped 1:1 to a corresponding core connection, but multiple EVC classes can be combined into the same core connection to simplify network operations. With respect to bandwidth profile mapping, this mapping should be implemented based on the estimate of traffic volume directed to each core connection. For example, if 30% of the EVC traffic is determined to be "gold" and is directed to an ATM connection used exclusively for "gold" traffic, the bandwidth of the ATM VCC can be estimated accordingly.

Ethernet Connections Multiplexing

In accordance with the present invention, an IWF can optionally multiplex multiple EVCs that terminate on the same IWF into the same ATM core. This arrangement results in increased core network scalability and efficiency through sharing and aggregation. In this embodiment, as with other described embodiments, each EVC can be identified by a port, port+VID(s) or MAC address. Also, the multiplexed EVCs can belong to one or more customers and can span multiple UNIs. In this embodiment, the shared ATM core provides the same options described above, namely, a single VCC with a single service class, multiple single-CoS VCCs or a single multiple-CoS VCC. Ethernet frames are de-multiplexed in the ATM to Ethernet direction using the EVC identifier, which should be unique within the MEN or at least within the aggregate.

Ethernet connection multiplexing can preferably be implemented using a number of methods. According to one method, the EVC's traveling between the same IWFs can be aggregated and multiplexed. The aggregated EVCs can be mapped onto the ATM core. According to another method, the EVCs can be directly mapped/multiplexed onto the ATM core without being aggregated. These methods are described below in detail with reference to FIGS. 28-31.

Figure 28:
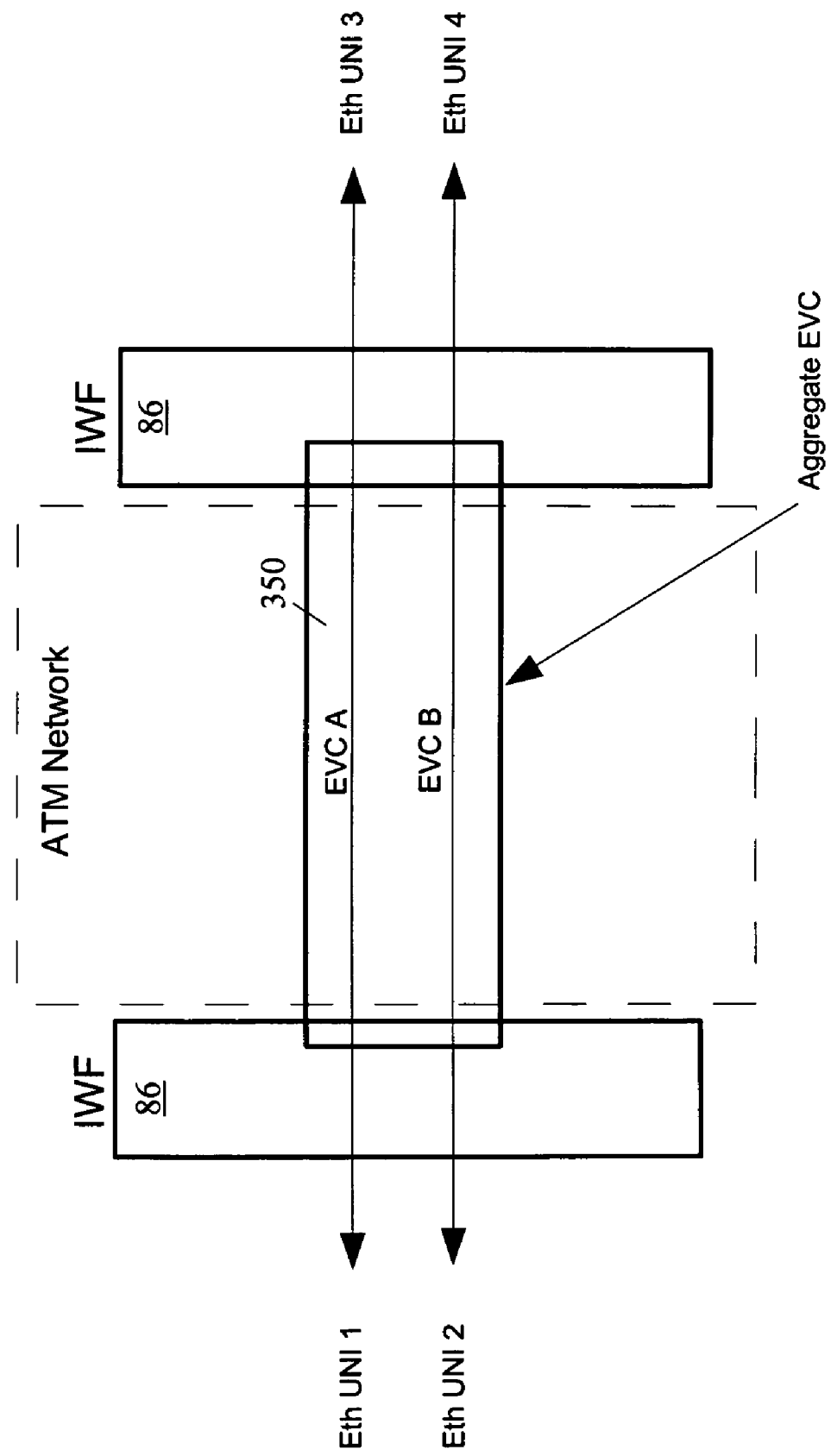
FIG. 28 is a block diagram of aggregate EVCs transported over an ATM network.

Aggregate EVCs are described with reference to the diagram of FIG. 28. Aggregate EVC 350, comprised of EVC A and EVC B is transported across core ATM network 88 between IWFs 86. The connections within an Aggregate EVC may belong to a single customer (in which case, QoS UNI functions such as bandwidth profiles and policing can optionally be performed for the Aggregate EVC), or to multiple customers that share the same originating and terminating IWFs). Of note, although many of the drawing figures herein use IWFs 86 as exemplary IWFs, it is understood that this is done for ease of explanation and expediency. IWF functions integrated as part of other devices, such as ATM CE or service provider PE devices 84 can readily be used. Because an EVC is defined between two UNIs, an aggregate EVC that includes multiple EVCs that have the same end points can likewise be defined. As is shown in FIG. 28, aggregate EVC 350 can be defined because EVC A and EVC B share the same IWF end points.

The EVCs are distinguishable at the egress IWF to allow demultiplexing of the frames onto the various UNIs. For example, the UNI MAC addresses must be globally unique throughout the MEN. In the alternative, tunneling may be used in the core ATM network 88, when the IWF assigns a unique label to the frames belonging to each EVC. Examples of tunneling include but are not limited to Ethernet MAC-in-MAC or Q-in-Q. The bandwidth profile of the aggregate EVC should be based on the summation of the BW profiles of its constituent EVCs. Allowance for overbooking and statistical sharing can optionally be made. The class of service for the EVC frames can be preserved in the aggregate EVC or mapped to different tunnel CoS indicators based on the configuration. The same CoS mappings are typically applied to all EVC frames. However, it is contemplated that different CoS mappings can be implemented for the individual EVCs to suit individual design and performance requirements.

The methods and arrangements described above for non-aggregate EVC transport through system 10 are applicable to aggregate EVC transport as well and are based on aggregate EVC CoS support, ATM network capabilities and QoS options. As discussed above, three exemplary methods include (1) using a single legacy ATM VCC with a single CoS in the core, (2) using multiple legacy ATM VCCs which support multiple CoS and (3) using a single multi-CoS ATM VCC in which the VCC is arranged to support multiple CoS based on the frame CoS indication.

Admission control is also defined for the multiplexed EVC embodiment in the case where multiple EVCs map to a VCC. In the multiplexing case, there is no one to one correspondence between traffic parameters of the Ethernet and ATM connections. However, the concepts explained and formulas described for the non-multiplexing cases for traffic parameters and over-head calculation can help with the connection admission control function. For example, hierarchical connection admission control (CAC) is typically performed for admitting the first VCC on the link and next for admitting the EVCs onto the VCC.

Initially, the ATM VCC is configured with enough bandwidth to accommodate the total anticipated Ethernet traffic between the two IWFs. An admission control function is typically performed admitting the VCC on the physical or logical link. The "equivalent" bandwidth of the VCC is next computed. This bandwidth provides the virtual pipe capacity that's used to admit the Ethernet connections.

Next, the CAC function is executed for admitting the Ethernet connections on the ATM pipe. The equivalent bandwidth of the Ethernet connection is calculated from its traffic parameters, overhead conversion, required QoS, the size of the ATM connection and the underlying link capacity. If multiplexed Ethernet connections are transported over multiple ATM VCCs, the bandwidth management function should account for each service classNCC separately. This can be done from the EVC's service class bandwidth profiles or by calculating an estimate of the bandwidth profile for each VCC if the EVC bandwidth profile is not broken down to the service class level.

A number of Ethernet multiplexing scenarios for a single CoS are described herein. These scenarios include port aggregation, VLAN aggregation and partial VLAN aggregation. Each of these examples build on the non-multiplexing interworking methods described earlier. Of note, although a single CoS case is described, it is assumed that one of ordinary skill could extend the description herein to multiple CoS implementations.

Figure 29:
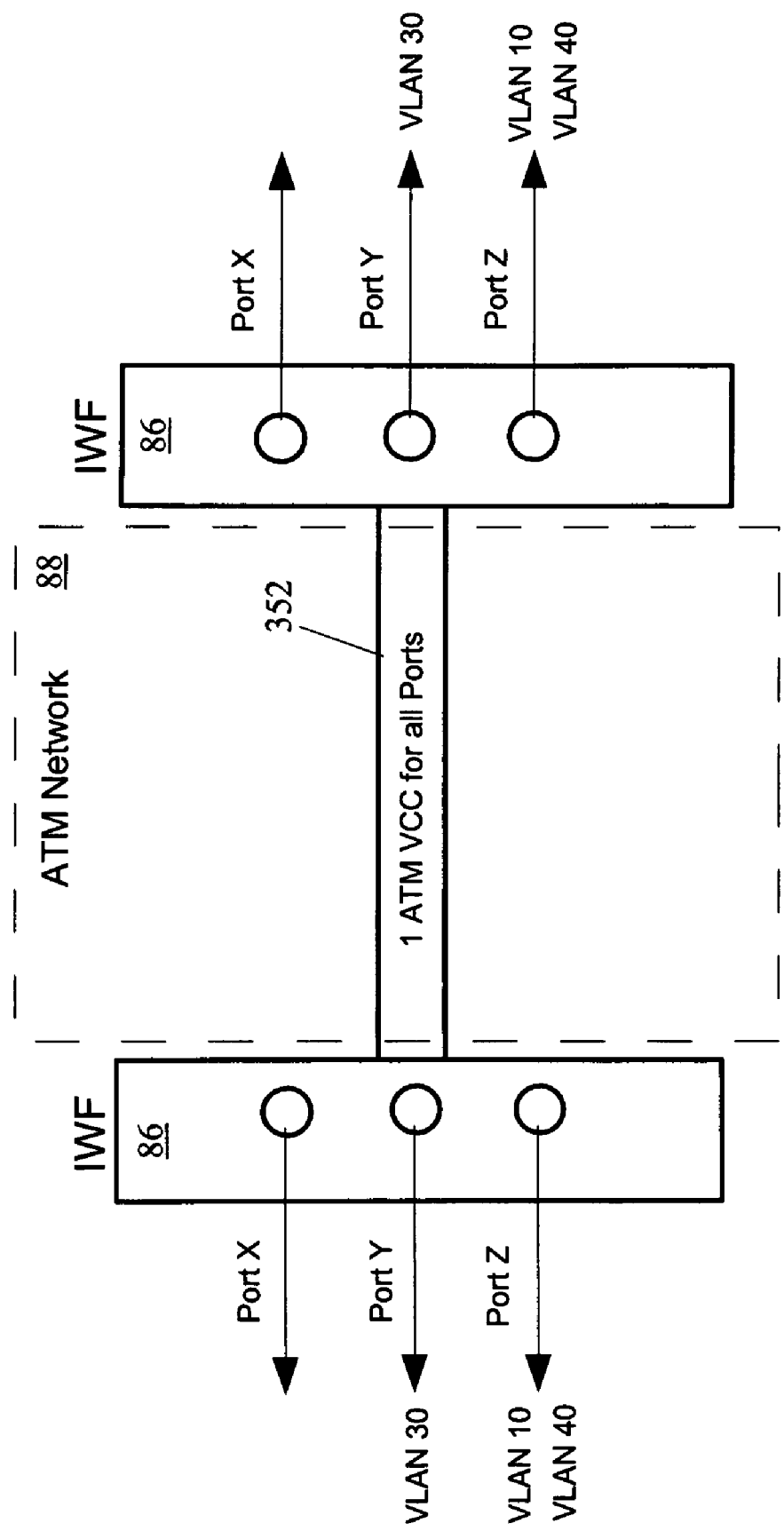
FIG. 29 is a block diagram showing an example of port aggregation.

Port aggregation is explained with reference to the diagram of FIG. 29. In this example, "n" Ethernet ports or EVCs, i.e., with or without VLAN support, are multiplexed into one ATM VCC. Each port is treated by IWF 86 as a single connection and, if applicable, all VLANs on the port are carried transparently. This arrangement is readily scalable. As shown in FIG. 29, Ports X, Y and Z in which port Y carries VLAN 30 and port Z carries VLAN 10 and VLAN 40 are multiplexed into a single VCC 352. It is contemplated that multiple VCCs (not shown) can be used for load sharing and resiliency.

It is also contemplated that, as a variation, the bridging function can be implemented by aggregating different ports on the IWFs 86. As such, ports X, Y and Z can be connected to a single port at the egress IWF 86. Traffic can be separated at the egress IWF 86 as long as the MAC source and destination address combination is unique. If MAC addresses are not unique, port aggregation can not be used or some other aggregation scheme, such as MAC-in-MAC or Q-in-Q is required at the ingress IWF 86 to enable the connections to be separated.

Figure 30:
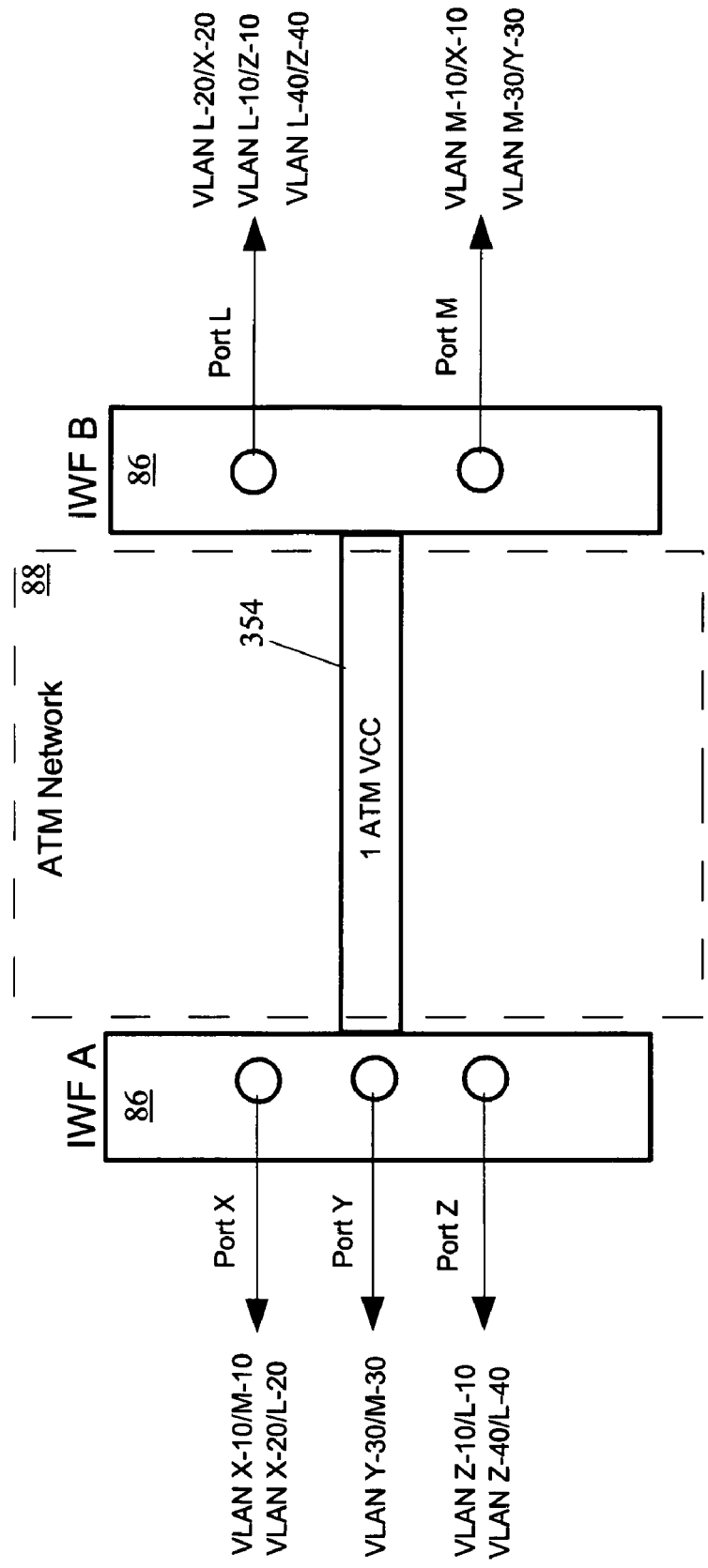
FIG. 30 is a block diagram of virtual local area network aggregation.

Another example of n:1 connection multiplexing, namely VLAN aggregation, is explained with reference to FIG. 30. In this example, "n" Ethernet VLANs on the same or different ports are mapped to a single ATM VCC. This arrangement advantageously allows VLANs originating on the same Ethernet to be forwarded to different egress interfaces/ports based on the destination MAC address. Recall that the MAC address is preserved in all network interworking scenarios. As is shown in FIG. 30, five EVCs are being transported from ingress IWF 86 to egress IWF 86 across a single VCC 354. Ports X and Z support two EVCs each, while port Y supports a single EVC. The VLAN notation used in FIG. 30 refers to the source VLAN and port and the destination VLAN and port. For example, "VLAN X-10/M-10" refers to a source of VLAN 10 on port X and destination VLAN 10 on port M. These five EVCs are multiplexed together and transported as the single VCC 354. Also, as with the port aggregation of FIG. 29, the use of multiple VCCs for load sharing and the variation in which different ports on the IWFs can be aggregated is applicable to the VLAN aggregation example of FIG. 30.

Figure 31:
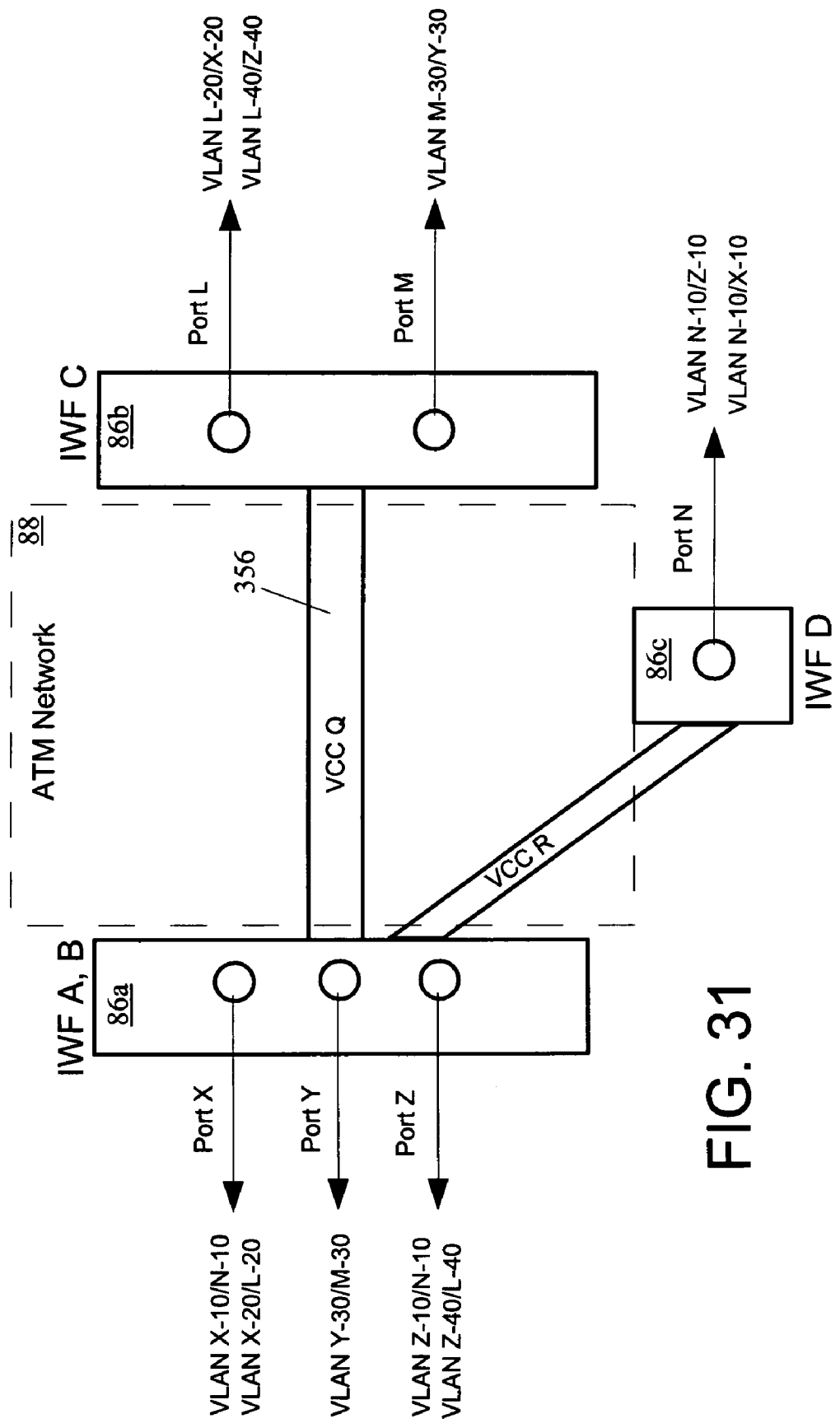
FIG. 31 is a block diagram of partial virtual local area network aggregation.

Another example of n:1 connection multiplexing, namely partial VLAN aggregation, is explained with reference to FIG. 31. In this example, VLANs are partially bundled based on the destination IWF. This arrangement allows the partial aggregation of a subset of VLANs on an ATM VCC, thereby allowing communication with multiple IWFs 86, for example, from IWF A and B (shown as 86*a*) to physically separate IWF C (shown as 86*b*) and IWF D (shown as 86*c*) via two separate VCCs Q and R, respectively. This arrangement allows for the flexible mapping of VLANs from a single ingress IWF to multiple egress IWFs. For example, port Z sources two VLANS, namely VLAN Z-10 and VLAN Z-40, each of which has a destination port on different IWFs (IWF 86*b* and IWF 86*c*). Also, as with the port aggregation of FIG. 29, the use of multiple VCCs for load sharing and the variation in which different ports on the IWFs can be aggregated is applicable to the VLAN aggregation example of FIG. 31.

The present invention advantageously provides a system, method and function for interworking between Ethernet and ATM networks in a manner which maintains and supports class of service definitions from one network protocol to the other.

The present invention can be realized in hardware, software, or a combination of hardware and software. An implementation of the method and system of the present invention can be realized in a centralized fashion in one computing system, or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. An interworking device for supporting network interworking between an Ethernet communication network and an ATM network, the interworking device including:
   a first network interface operable to communicate with the Ethernet communication network using an Ethernet communication protocol;
   a second network interface operable to communicate with the ATM communication network using an ATM protocol; and
   a processing unit in communication with the first network interface and the second network interface, the processing unit:
      encapsulating frames received from the Ethernet network into ATM frames;
      decapsulating frames received from the ATM network to recover Ethernet frames; and
      mapping parameters corresponding to the received one of the ATM and Ethernet frames into the other of the ATM and Ethernet frames, the mapped parameters including connection configuration control plane information and data plane parameters corresponding to individual frames, the data plane parameters including discard eligibility mapping between a cell loss priority (CLP) field in the ATM frame with a p-bits value in the Ethernet frame.

2. The device according to claim 1, wherein the connection configuration control plane information includes at least one of connection mapping information, class of service class mapping information, and traffic parameters information.

3. The device according to claim 2, wherein connection mapping information includes mapping Ethernet connection data to an ATM VCC.

4. The device according to claim 3, wherein Ethernet connection data includes an Ethernet virtual LAN identifier.

5. The device according to claim 2, wherein the processing unit further determines a correction factor to map data rates between the Ethernet frames and the ATM frames and wherein the processing unit further uses traffic parameters from one of the ATM and Ethernet networks to calculate traffic parameters for the other of the ATM and Ethernet networks.

6. The device according to claim 2, wherein class of service mapping is used by the processing unit to maintain a QoS across the Ethernet and ATM networks.

7. The device according to claim 6, wherein the Ethernet network supports multiple classes of service, and wherein, for the Ethernet to ATM direction, an ATM VCC is assigned to each Ethernet class of service.

8. The device according to claim 6, wherein the Ethernet network supports multiple classes of service, and wherein, for the Ethernet to ATM direction, a separate ATM VCC is assigned to at least one Ethernet class of service based on one or more of a virtual LAN identifier, a p-bits value and the Ethernet interface upon which the frame was received.

9. The device according to claim 2, wherein the Ethernet network includes at least one Ethernet virtual connection (EVC) and wherein frame processing for multiple Ethernet service classes (CoS) are supported for each EVC, the processing unit using the Ethernet frame service class to select one of a plurality of outgoing ATM VCCs for encapsulation and mapping.

10. An interworking device for supporting network interworking between an Ethernet communication network and an ATM network, the interworking device including:
   a first network interface operable to communicate with the Ethernet communication network using an Ethernet communication protocol;
   a second network interface operable to communicate with the ATM communication network using an ATM protocol; and
   a processing unit in communication with the first network interface and the second network interface, the processing unit:
      encapsulating frames received from the Ethernet network into ATM frames;
      decapsulating frames received from the ATM network to recover Ethernet frames; and
      mapping parameters corresponding to the received one of the ATM and Ethernet frames into the other of the ATM and Ethernet frames, the mapped parameters including connection configuration control plane information and data plane parameters corresponding to individual frames, the data plane parameters including congestion information mapping between an explicit forward congestion indication (EFCI) field in the ATM cell and a p-bits value in the Ethernet frame, the p-bits being used to carry congestion information in at least one of the forward and backward direction.

11. The device according to claim 1, wherein the discard eligibility mapping is based on an Ethernet per hop behavior.

12. The device according to claim 1, wherein the processing unit further performs one of dropping frames that exceed a maximum supported Ethernet frame length for frames traveling in the ATM to Ethernet direction and dropping ATM frames that exceed a maximum supported Ethernet frame length for frames traveling in the ATM to Ethernet direction.

13. The device according to claim 1, wherein mapping parameters corresponding to the received one of the ATM and Ethernet frames into the other of the ATM and Ethernet frames includes:
   classifying parameters of a received frame;
   mapping and marking the parameters of a received frame into a frame to be transmitted; and
   forwarding the frame to one of the first and second network interfaces for transmission.

14. The device according to claim 1, wherein the Ethernet network includes a plurality of Ethernet virtual connections, and wherein the processing unit aggregates at least a portion of the plurality of Ethernet virtual connections into a single ATM connection for transmission to the ATM network.

15. A method for interworking between an Ethernet communication network and an ATM network, the method comprising:
   encapsulating frames received from the Ethernet network into ATM frames
   decapsulating frames received from the ATM network to recover Ethernet frames; and
   mapping parameters corresponding to the received one of the ATM and Ethernet frames into the other of the ATM and Ethernet frames, the mapped parameters including connection configuration control plane information and data plane parameters corresponding to individual frames, the data plane parameters including discard eligibility mapping between a cell loss priority (CLP) field in the ATM frame and a p-bit in the Ethernet frame.

16. The method according to claim 15, wherein the connection configuration control plane information includes at least one of connection mapping information, class of service class mapping information and traffic parameters information.

17. The method according to claim 16, wherein connection mapping information includes mapping Ethernet connection data to an ATM VCC.

18. The method according to claim 17, wherein Ethernet connection data includes an Ethernet virtual LAN identifier.

19. The method according to claim 16, further comprising determining a correction factor to map data rates between the Ethernet frames and the ATM frames and wherein the processing unit further uses traffic parameters from one of the ATM and Ethernet networks to calculate traffic parameters for the other of the ATM and Ethernet networks.

20. The method according to claim 16, further comprising using the class of service mapping to maintain a QoS across the Ethernet and ATM networks.

21. The method according to claim 20, wherein the Ethernet network supports multiple classes of service, and wherein the method further comprises, for the Ethernet to ATM direction, assigning a ATM VCC to each Ethernet class of service.

22. The method according to claim 20, wherein the Ethernet network supports multiple classes of service, and wherein the method further comprises, for the Ethernet to ATM direction, assigning a separate ATM VCC to at least one Ethernet class of service based on one or more of a virtual LAN identifier, a p-bits value and the Ethernet interface upon which the frame was received.

23. The method according to claim 18, wherein the Ethernet network includes at least one Ethernet virtual connection (EVC) and wherein frame processing for multiple Ethernet service classes (CoS) are supported for each EVC, the method further comprising using the Ethernet frame service class to select one of a plurality of outgoing ATM VCCs for encapsulation and mapping.

24. A method for interworking between an Ethernet communication network and an ATM network, the method comprising:
encapsulating frames received from the Ethernet network into ATM frames
decapsulating frames received from the ATM network to recover Ethernet frames; and
mapping parameters corresponding to the received one of the ATM and Ethernet frames into the other of the ATM and Ethernet frames, the mapped parameters including connection configuration control plane information and data plane parameters corresponding to individual frames, the data plane parameters including congestion information mapping between an explicit forward congestion indication (EFCI) field in the ATM cell and a p-bits value in the Ethernet frame, the p-bits being used to carry congestion information in at least one of the forward and backward direction.

25. The method according to claim 15, wherein the discard eligibility mapping is based on an Ethernet per hop behavior.

26. The method according to claim 15, wherein the method further comprises one of dropping frames that exceed a maximum supported Ethernet frame length for frames traveling in the ATM to Ethernet direction and dropping ATM frames that exceed a maximum supported Ethernet frame length for frames traveling in the ATM to Ethernet direction.

27. The method according to claim 15, wherein mapping parameters corresponding to the received one of the ATM and Ethernet frames into the other of the ATM and Ethernet frames includes:
classifying parameters of a received frame;
mapping and marking the parameters of a received frame into a frame to be transmitted; and
forwarding the frame to one of the first and second network interfaces for transmission.

28. The method according to claim 15, further comprising performing interworking with a third communication network employing a networking technology other than Ethernet and ATM, the third communication network being coupled between the Ethernet communication network and the ATM communication network, wherein the interworking is performed on the Ethernet side of the third communication network.

29. The method according to claim 15, wherein the Ethernet network includes a plurality of Ethernet virtual connections, and wherein the method further comprises aggregating at least a portion of the plurality of Ethernet virtual connections into a single ATM connection for transmission to the ATM network.

30. A storage medium storing a computer program which when executed by a processing unit performs a method for network interworking between an Ethernet communication network and an ATM network, the method comprising:
encapsulating frames received from the Ethernet network into ATM frames
decapsulating frames received from the ATM network to recover Ethernet frames; and
mapping parameters corresponding to the received one of the ATM and Ethernet frames into the other of the ATM and Ethernet frames, the mapped parameters including connection configuration control plane information and data plane parameters corresponding to individual frames, the data plane parameters including discard eligibility mapping between a cell loss priority (CLP) field in the ATM frame and a p-bit in the Ethernet frame.

* * * * *